(12) United States Patent
Tadic-Galeb et al.

(10) Patent No.: US 6,220,713 B1
(45) Date of Patent: Apr. 24, 2001

(54) PROJECTION LENS AND SYSTEM

(75) Inventors: Biljana Tadic-Galeb, Thousand Oaks; Robert E. Fischer, Westlake Village; David Kappel, San Diego, all of CA (US); Neil L. Condra, The Woodlands, TX (US); Ann M. Muscato; Sean M. Donnelly, both of Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/177,931

(22) Filed: Oct. 23, 1998

(51) Int. Cl.[7] .................................................. G03B 21/28
(52) U.S. Cl. ............................................ 353/77; 353/74
(58) Field of Search ................... 359/649, 642; 353/77, 74

(56) References Cited

U.S. PATENT DOCUMENTS

| | | | |
|---|---|---|---|
| Re. 34,492 | 12/1993 | Roberts | 359/48 |
| 4,425,028 | 1/1984 | Gagnon et al. | 350/337 |
| 4,544,237 | 10/1985 | Gagnon | 350/331 R |
| 4,799,137 | 1/1989 | Aho | 362/309 |
| 4,874,228 | 10/1989 | Aho et al. | 350/345 |
| 4,961,642 | 10/1990 | Ogino | 353/38 |
| 5,054,885 | 10/1991 | Melby | 359/618 |
| 5,190,370 | 3/1993 | Miller et al. | 362/340 |
| 5,218,480 | 6/1993 | Moskovich | 359/753 |
| 5,237,641 | 8/1993 | Jacobson et al. | 385/146 |
| 5,243,459 | 9/1993 | Winston et al. | 359/362 |
| 5,303,322 | 4/1994 | Winston et al. | 385/146 |
| 5,323,414 | 6/1994 | Baird et al. | 372/75 |
| 5,381,309 | 1/1995 | Borchardt | 362/31 |
| 5,389,982 | 2/1995 | Lee | 353/37 |
| 5,404,076 | 4/1995 | Dolan et al. | 313/572 |
| 5,467,154 | 11/1995 | Gale et al. | 353/119 |
| 5,504,391 | 4/1996 | Turner et al. | 313/570 |
| 5,528,720 | 6/1996 | Winston et al. | 385/146 |
| 5,557,343 | 9/1996 | Yamagishi | 348/781 |
| 5,557,478 | 9/1996 | Winston et al. | 359/853 |
| 5,594,830 | 1/1997 | Winston et al. | 385/146 |
| 5,604,607 | 2/1997 | Mirzaoff | 358/484 |
| 5,606,220 | 2/1997 | Dolan | 313/637 |
| 5,610,768 | 3/1997 | Winston | 359/727 |
| 5,621,486 | 4/1997 | Doany et al. | 348/756 |
| 5,626,800 | 5/1997 | Williams et al. | 264/1.38 |
| 5,670,842 | 9/1997 | Dolan et al. | 313/570 |
| 5,675,677 | 10/1997 | Davenport et al. | 385/31 |
| 5,682,080 | 10/1997 | Dolan et al. | 313/570 |
| 5,686,793 | 11/1997 | Turner et al. | 313/570 |
| 5,692,820 | 12/1997 | Gale et al. | 353/77 |

FOREIGN PATENT DOCUMENTS

| | | |
|---|---|---|
| 03063690 | 3/1991 | (JP) . |
| 03243932 | 10/1991 | (JP) . |
| WO 97/27606 | 7/1997 | (WO) . |
| WO 97/45858 | 12/1997 | (WO) . |

*Primary Examiner*—Hung Xuan Dang
(74) *Attorney, Agent, or Firm*—Akin, Gump, Strauss, Hauer & Feld, LLP

(57) ABSTRACT

Projection lenses and projection lens systems are telecentric between an illumination subsystem and a set of imagers. The lenses and systems can exhibit color fringing correction, uniform imager illumination, athermalization, and component articulation for improved imaging. The lenses and systems may be employed in display apparatuses, such as folded display apparatuses that have decreased footprint size, but long effective projection lengths.

6 Claims, 18 Drawing Sheets

PROJECTION LENS AND SYSTEM

BACKGROUND OF THE INVENTION

1. Field of the Invention

The present invention relates to projection lenses and projection systems, and, more particularly, to projection lenses and systems that provide improved use of the total light energy emitted by an illumination subsystem.

2. Description of Related Art

Light projection is used to display images on large surfaces, such as large computer displays or television screens. In front projection systems, an image beam is projected from an image source onto the front side of a reflection-type, angle transforming screen, which reflects the light toward a viewer positioned in front of the screen. In rear projection systems, the image beam is projected onto the rear side of a transmission-type, angle transforming screen and transmitted toward a viewer located in front of the screen.

In single exit pupil projection systems, three primary color images are projected through the same lens to form a full color image. These systems avoid color shift in the projected image and color mixing or combining need not be performed by their screen as in a three lens system. Single exit pupil systems may be either of the transmissive variety or of the reflective variety. Additional information about projection lenses and systems can be found in U.S. Pat. No. 5,218,480, issued to Moskovitch, entitled "Retrofocus Wide Angle Lenses," incorporated by reference herein in its entirety.

Several considerations stand out for such projection systems. One item is the efficient use of the light energy output of an illumination subsystem in a projection system. Matching the illumination subsystem with imagers (e.g., a liquid crystal display (LCD) or spatial light modulator (SLM)) in the projection system to obtain a bright, uniformly illuminated image is important. Etendue considerations have not been particularly emphasized in previous projection system designs. Examples of the type of light sources in illumination subsystems, amongst others, for which efficiency can matter include metal-halide lamps and those described in U.S. Pat. Nos. 5,404,076 and 5,606,220, issued to Dolan et al., entitled "Lamp Including Sulfur" and "Visible Lamp Including Selenium or Sulfur," respectively, and in U.S. Pat. No. Re. 34,492, issued to Roberts, entitled "Combination Lamp and Integrating Sphere For Efficiently Coupling Radiant Energy From A Gas Discharge Into A Lightguide." U.S. Pat. Nos. 5,404,076, 5,606,220, and Re. 34,492 are incorporated by reference herein in their entirety. Other examples include lamps described in PCT Pat. application No. PCT/US97/10490, by MacLennan et al., published as WO 97/45858 on Dec. 4, 1997, also incorporated by reference herein in its entirety.

Another consideration is system size. For rear projection and computer screen applications, a small overall package size is desirable except perhaps for the screen. The physical size of individual components, such as lenses, filters, stops, etc., should be made relatively small while a large image size should be produced. Although a system may be small in size, however, its compactness may not necessarily be optimized. For instance, in projection systems employing three LCD imagers, one for each primary color, the distance between the projection lens and the imagers may have to be increased to accommodate field lenses required to better match the illumination subsystem and the imagers.

In some previous projection lenses, the filtering of image or imager illumination light has been of concern. A filter could be placed, for example, within an aperture stop of a projection lens. However, aperture stops have previously been disadvantageously positioned within the physical confines of one of the lenses or other elements making up the projection lens.

Thermal effects have been a concern when polymer materials, despite their generally good optical properties, are used to construct individual lens elements in projection lens systems. Aspheres, although useful in limiting lens aberrations and in reducing lens size, can reveal detrimental thermal effects with high power light when positively powered optical elements are constructed of these materials. Acrylic materials, for example, present a relatively large change in refractive index with temperature. A lens fashioned out of acrylic can, therefore, display an internal temperature change or gradient. A corresponding optical power change can result with high powered light, leading to performance deficiencies.

Other considerations in projection systems include the effects of dispersion in optical elements and manufacturing tolerances. Dispersion effects frequently appear in optical systems in which all three primary colors are transmitted through the same optical elements. Manufacturing tolerances can impact parts interchangeability. Manufacturing tolerances may result in performance variations that need to be addressed by appropriate means to ensure that production model projection lenses and systems will demonstrate similar performance.

The present invention is directed to improving projection lenses and systems. The present invention is also directed to overcoming or reducing one or more of the problems and deficiencies set forth above or other problems and deficiencies.

SUMMARY OF THE INVENTION

In general, in one aspect, embodiments of the invention feature a projection lens system, that includes an illumination subsystem including a light source and a lightguide adapted to direct illumination light from the light source. The projection lens system also includes a projection lens adapted to receive the illumination light from the lightguide and to direct image light derived from the illumination light.

BRIEF DESCRIPTION OF THE DRAWINGS

Other objects and advantages of the invention will become apparent upon reading the following detailed description and upon reference to the drawings in which:

FIGS. 18 and 18A are views of a portion of a projection lens system in accordance with a fourth embodiment of the invention.

Figure 1:
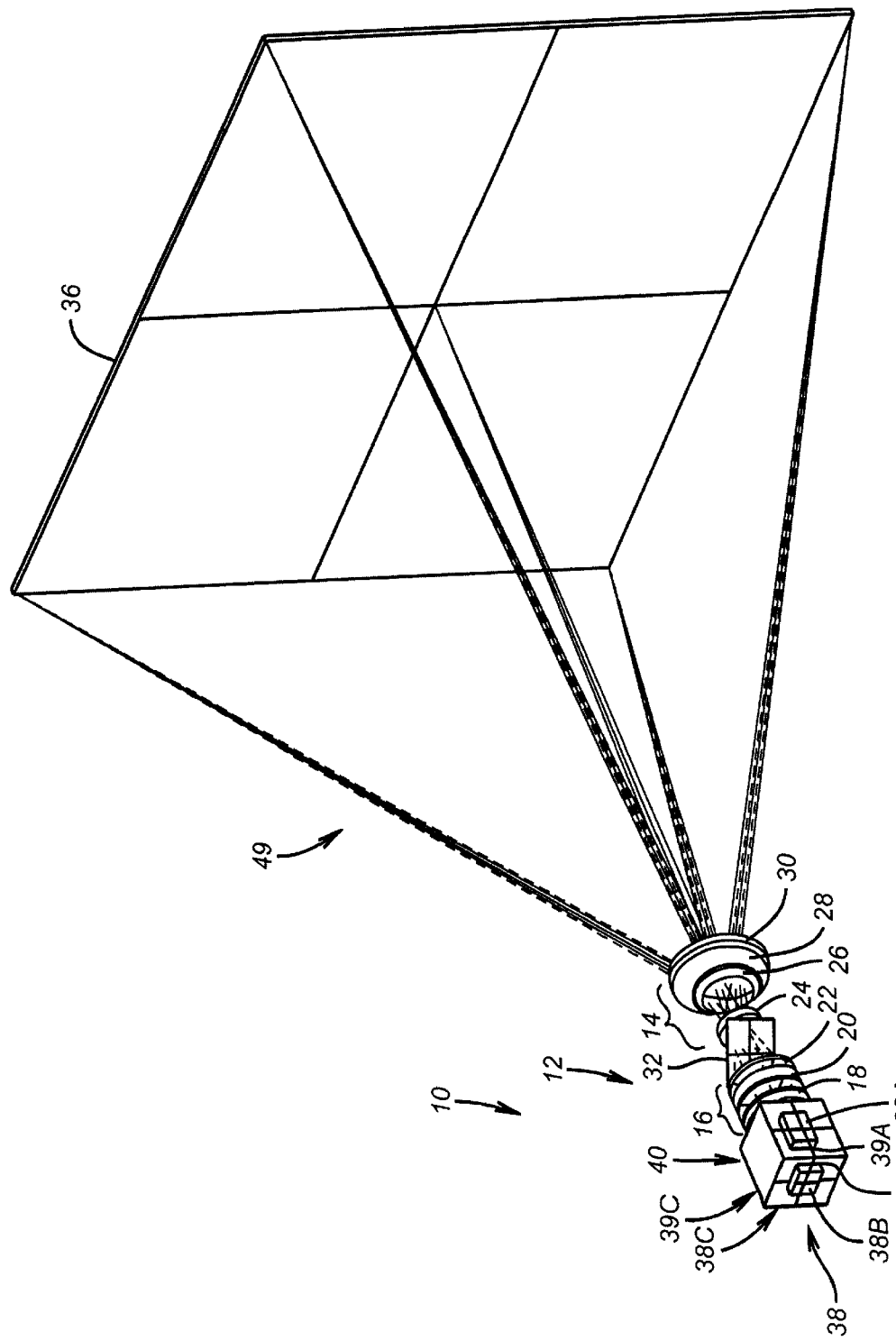
FIG. 1 is a perspective view of a projection lens system in accordance with a first embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Improved projection lenses and an improved projection lens systems are described in accordance with embodiments of the invention. The projection lenses and systems have utility in both front and rear projection systems. The projection lens systems can include illumination and relay lens subsystems. The projection lenses and systems may be employed advantageously in so-called "folded" optical display systems. In the description and drawings of the projection lenses and systems below, like reference numerals are indicative of like parts.

Figure 2:
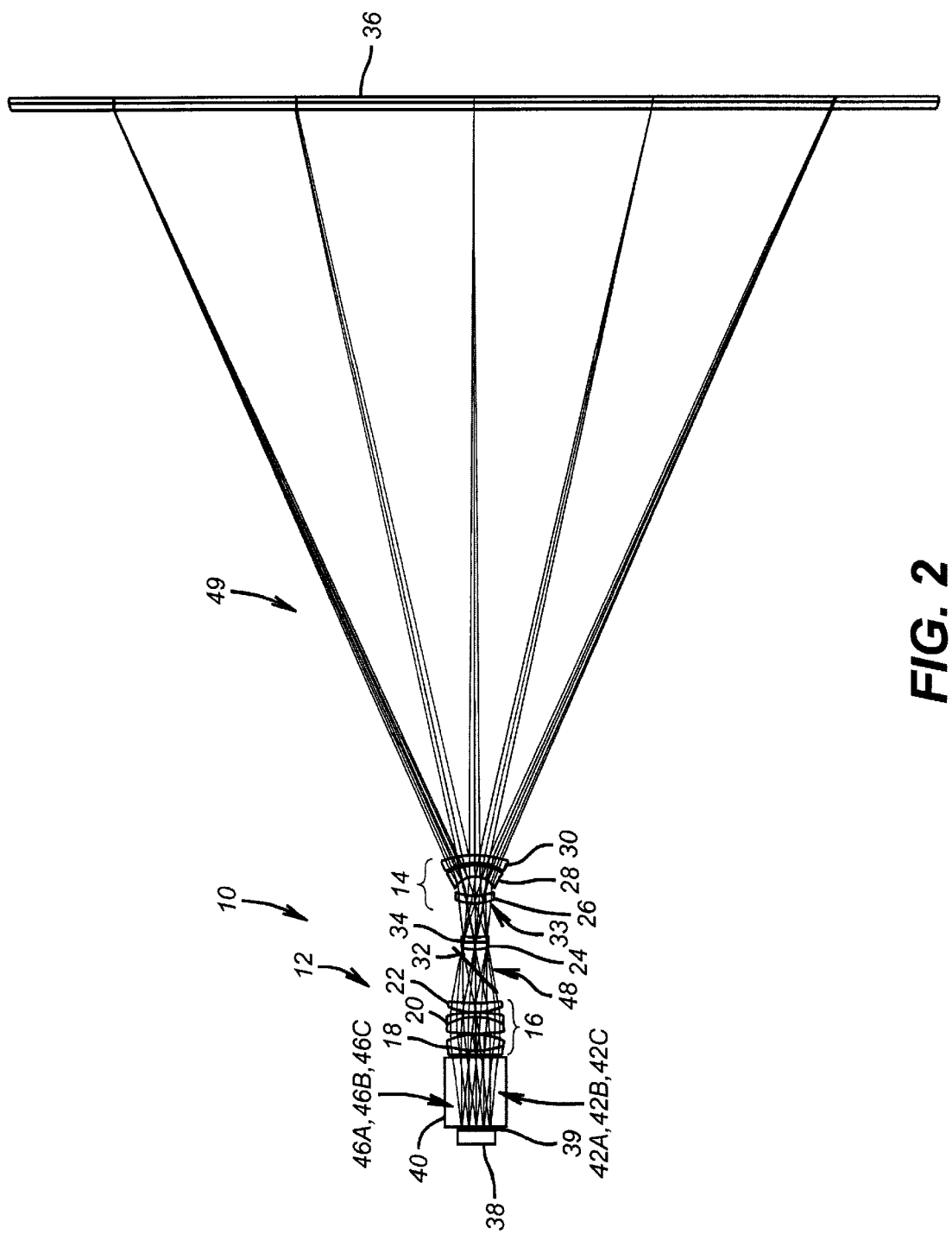
FIG. 2 is a top view of the projection lens system in FIG. 1.
Figure 3:
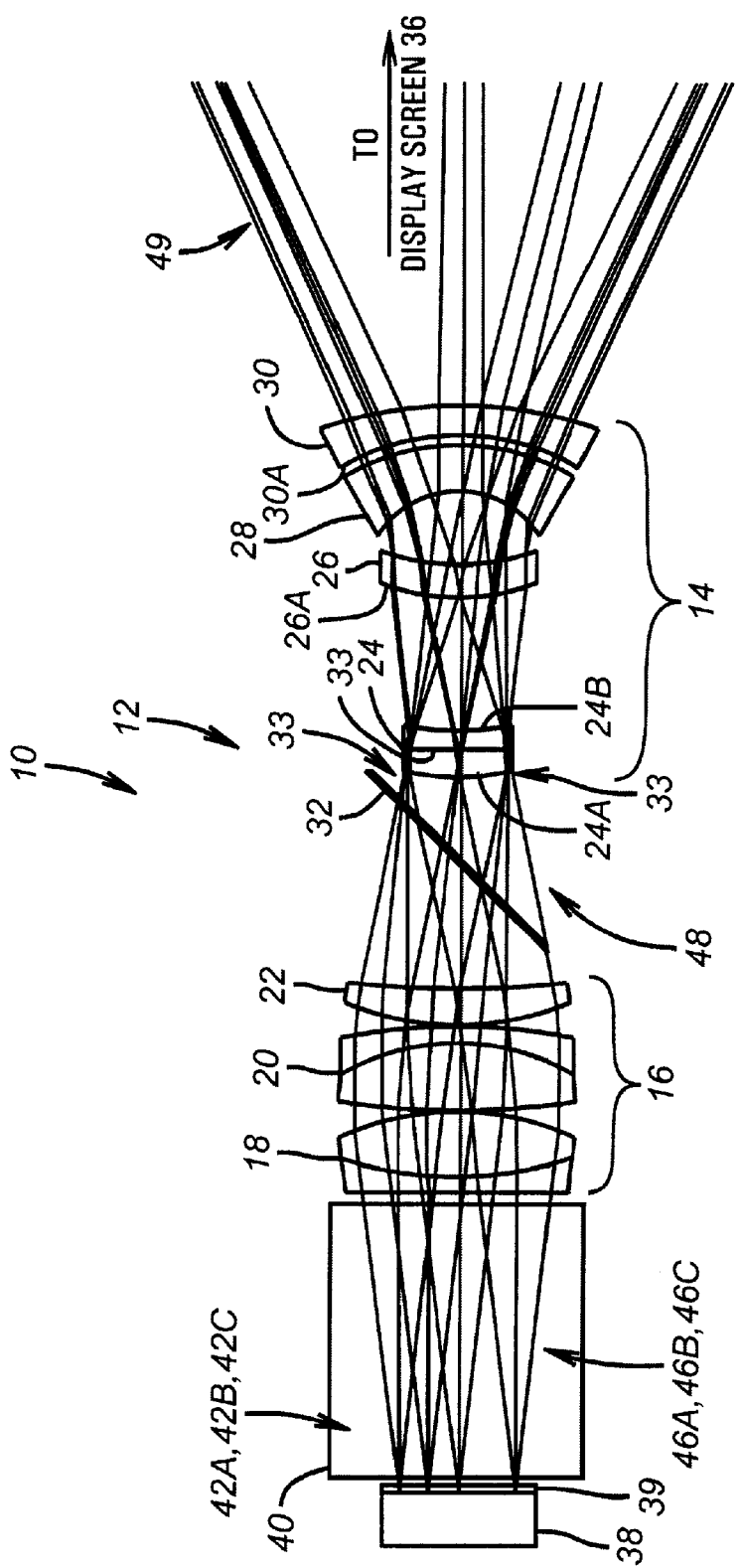
FIG. 3 is a more detailed top view of the projection lens system in FIG. 1

FIGS. 1–3 illustrate a reflection-based projection lens system 10 in accordance with a first embodiment of the invention. The projection lens system 10 includes a projection lens 12 having a first or front lens unit 14 and a second or back lens unit 16. The front lens unit 14 and the back lens unit 16 are separated by an air gap. The front lens unit 14 has overall zero, near-zero or weak (e.g., negative) optical power with an angular magnification to project over a wide field of view. Other embodiments can have positive or negative optical powers for the front lens unit 14. The second lens unit 16 has overall positive optical power. In the exemplary embodiment shown in FIGS. 1–3, the second lens unit 16 includes lens elements 18, 20, and 22 and the first lens unit 14 includes lens elements 24, 26, 28, and 30. The lens elements 18, 20, 22, 24, and 26 are all positively powered lenses and the lens elements 28 and 30 are both negatively powered lenses. The lens elements 18, 20, and 24 may be doublets and the lens elements 22, 26, 28 and 30 may be meniscus lenses, although other lens types or powers could be used. Other arrangements and number of elements can be envisioned, as will be appreciated by those skilled in the art having the benefit of the present disclosure. These other arrangements and number of elements are included within the scope and spirit of the present invention.

FIG. 3 shows a larger view of the projection lens system 10 and the projection lens 12. The projection lens 12 includes nine elements in the exemplary embodiment. These nine elements include a reflecting linear polarizer 32 in addition to the lens elements 18, 20, 23, 24, 26, 28, and 30, and a clean-up element 34 (see FIGS. 2 and 3). In other embodiments, the number of elements can be other than nine. The clean-up element 34 can be an absorptive linear polarizer and is optional. The reflecting linear polarizer 32 may be constructed of double brightness enhancement film (DBEF), a variety of multilayer optical film (MOF), commercially available from Minnesota, Mining & Manufacturing Company. The reflecting linear polarizer 32 (e.g., MOF) is a substantially nonabsorbing polarizer. Hence, it does not substantially absorb light that it transmits or reflects. An exemplary construction of the reflecting linear polarizer 32 is a sandwich of glass, optical cement, MOF, optical cement, and glass. The reflecting linear polarizer 32 is oriented to substantially reflect first linear polarization components of light of desired colors (which can be white light or substantially white light) from a light source (not shown in FIGS. 1–3) toward the rear lens unit 16 and to substantially transmit second linear polarization components (orthogonal to the first) and reflect undesired colors. For example, the reflecting linear polarizer 32 can be oriented with its high efficiency side toward the light source, such that incoming S polarization light is reflected and P polarization light is transmitted. An additional reflecting linear polarizer (not shown) constructed of MOF, for example, may be placed in the path of the transmitted light to reflect it back through the reflecting linear polarizer 32 to the light source. Such operation is useful with certain types of high intensity discharge (HID) lamps (to be described in more detail below) or other types of lamps for optical "pumping" of the light source to improve the efficiency of the light source for generating the desired light components. These lamps are exemplified in prior co-owned U.S. patent application Ser. Nos. 08/747,190, filed Nov. 12, 1996, by Richard M. Knox, entitled "High Efficiency Lamp Apparatus For Producing A Beam Of Polarized Light," and Ser. No. 08/771,326, filed Dec. 20, 1996, by William B. Mercer, entitled "Polarized Light Producing Lamp Apparatus That Uses Low Temperature Polarizing Film," both incorporated by reference herein in their entirety.

A remote aperture stop 33 is located near the lens element 24 between the reflecting linear polarizer 32 and the lens element 24, as shown in FIGS. 2 and 3. By positioning the aperture stop 33 remotely from the polarizer 32 (i.e., by it being an accessible aperture stop), diffractive and/or other out-of-angle light can effectively be blocked from images. As a result, contrast can be improved by pupil apodization for contrast enhancement and/or other needs. The aperture stop 33 can be designed to be very close to (i.e., proximate to or just outside) the lens 24. In certain embodiments, a filter can be positioned in the aperture stop 33 to filter image light passing through, as will be appreciated by those skilled in the art having the benefit of the present disclosure.

Whether the clean-up element 34 included in the exemplary embodiment in FIGS. 1–3 is used may depend on desired image contrast. The clean-up element 34 can be sandwiched between two lens elements 24A, 24B that make up the lens element 24, as shown in FIGS. 1–3, although other configurations are possible. The clean-up element 34 could be cemented between the two elements 24A, 24B using a suitable optical cement. In alternative embodiments, the clean-up element 34 could be positioned at any appropriate location in the front group 14, for instance: between the reflecting linear polarizer 32 and the lens element 24; between the lens elements 24 and 26; between the lens elements 26 and 28; or between the lens elements 30 and a display screen 36 (see FIGS. 1–3). In this last position, the clean-up element 34 may be attached (e.g., by suitable optical cement) to the lens element 30 or it may be completely external to the lens 12. The clean-up element 34 is preferably positioned in the front group 14 at locations where the image light is not substantially diverging or of large ray angles.

The first lens unit 14 may include at least one aspherical surface or element (i.e., an asphere). For example, in the exemplary embodiment shown in FIGS. 1–3, the lens elements 26 and 30 can be aspheres having aspheric surfaces 26A and 30A, respectively. In other embodiments, different numbers of aspheric lens elements or surfaces can be combined with non-aspheres, and exhibit analogous or similar performance characteristics to the projection lens system 10. Moreover, additional embodiments exhibiting analogous or similar performance characteristics can include no aspheres and/or gradient index or diffractive optical components, as will be appreciated by those skilled in the art having the benefit of the present disclosure. All of these embodiments are included within the scope and spirit of the present invention.

In the exemplary embodiment shown in FIGS. 1–3, the projection lens system 10 also includes imager 38 for color imaging and a chromatic separator or beamsplitter 40. In general, as used herein, the imager 38 is understood to mean one or more color imagers, for example, imagers 38A, 38B, 38C for three-color imaging. Other numbers of imagers are possible, for example, one, two, four, or more. The number of imagers will depend, in general, on the specific implementation or design of the projection lens system 10 and/or an illumination subsystem for the projection lens 10. Examples of embodiments in which one or two imagers like imagers 38A, 38B, 38C could be used are field sequential color systems, as will be appreciated by those skilled in the art having the benefit of the present disclosure. For simplicity of presentation, in some of the drawings only one imager is shown, which is labeled as the imager 38 (see, e.g., FIGS. 2 and 3). In other drawings, all three imagers 38A, 38B, 38C will be shown when the discussion warrants it or when easily drawn. In the view shown in FIG. 1, the imager 38C is not visible as it is obscured by the chromatic separator 40. A separate cover glass 39A, 39B, 39C (indicated generally as numeral 39 in the drawings showing only the imager 36) is included for each of the respective imagers 38A, 38B, 38C. There is a small (not shown) air gap between each cover glass 39A, 39B, 39C and the respective imagers 38A, 38B, 38C. In other embodiments, the cover glass 39A, 39B, 39C may be integrated with the imager 38A, 38B, 38C, there may be no air gap, or there may be no cover glass at all. Each of the color imagers 38A, 38B, 38C may be LCD imagers, such as ferroelectric LCD (FLCD) imagers, or other forms of imagers.

Figure 4:
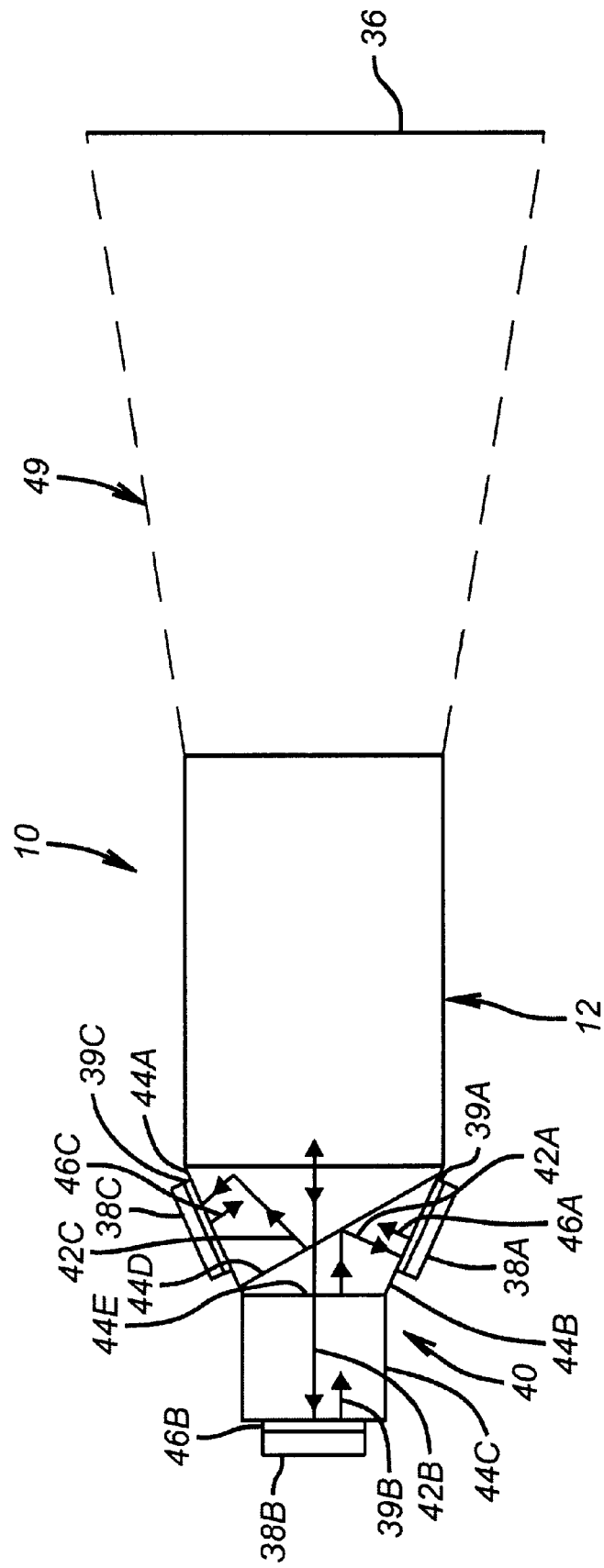
FIG. 4 is a detailed view of a portion of a projection lens system in accordance with an exemplary embodiment of the invention.

Any appropriate chromatic separator can be employed as the chromatic separator 40. In FIGS. 1–3, the chromatic separator is shown simply as a block. FIG. 4 offers a view of the imagers 38A, 38B, 38C and the chromatic separator 40 in an exemplary embodiment. The front lens unit 14, the rear lens unit 16, and the reflecting linear polarizer 32 are not in detail in FIG. 4. The chromatic separator in FIG. 4 is a Philips prism, which is discussed further below. The chromatic separator 40 splits the incoming white light received from an illumination subsystem (not shown in FIGS. 1–3) into three color bands, for example, the red, green, and blue primary colors, as generally indicated by respective numerals 42A, 42B, and 42C in FIGS. 2–4. The illumination subsystem includes the light source and the incoming white light is received by the chromatic separator 40 via reflection from the reflecting linear polarizer 32, as discussed above. The incoming white light may be substantially white or quasi-white light. Quasi-white light is defined to be light from a light source that is deficient in its output in one or more colors (or wavelength bands) of the visible spectrum. Substantially white or quasi-white light will be referred to herein simply as white light. The chromatic separator 40 separates the primary colors in the incoming white light in the exemplary embodiments shown in FIGS. 1–4. The color-separated light components 42A, 42B, 42C are directed along different paths to corresponding ones of the imagers 38A, 38B, 38C.

One way to direct the color-separated light 42A, 42B, 42C is to use the well-known Philips prism as the chromatic separator 40, as already mentioned. The Philips prism is a type of chromatic separator that includes one or more prism elements, for example, prism elements 44A, 44C, and an optional cover 44B, as shown in FIG. 4. Each of the prism elements 44A, 44C includes a highly reflective, multilayered coating (e.g., coatings 44D, 44E) designed to substantially reflect or transmit particular colors of light to separate the colors. Each of the coatings 44D, 44E preferentially reflect or transmit a color that is distinct from the colors reflected or transmitted by the multilayered coating on the other prism element. In other words, the coating 44D is, in general, different, and reflects and transmits differently, than the coating 44E. In other embodiments, the chromatic separator 40 could take other forms that function analogously or similarly to the Philips prism, such as the well known X-cube beamsplitter.

In typical use, each of the three color imagers 38A, 38B, 38C receives the color-separated light or bands of light 42A, 42B, 42C derived from the illumination subsystem (i.e., from illumination light) and reflects back a corresponding color-separated image imparted on each color band, as indicated schematically by numerals 46A, 46B, and 46C in FIGS. 2–4. The imagers 38A, 38B, 38C, if they are FLCDs, twisted nematic LCDs, or other types of spatial light modulators, each impart the respective color-separated image under control derived from an external video or other control signal (not shown). The control signal can be implemented as a temporal electrical modulation of electrooptic states of individual pixels (not shown) that are defined in the imagers 38A, 38B, 38C. Each pixel is individually electrically addressable for control of its states. One state (e.g., an "on" state) rotates (i.e., retards) the polarization of incoming light by substantially 90 degrees. Retardation occurs because the light impinging on the pixel makes a double pass through a quarter-wave optical thickness of the pixel with an intervening reflection. A reflector located behind the pixel or forming a back part of the pixel provides the reflection. The other state (i.e., an "off" state) does not substantially rotate the polarization before or after reflection during the double pass. Projectable gray levels are achievable at intermediate states between the on and off states, for example, if the imagers 38A, 38B, 38C are the twisted nematic LCDs, which have a variable birefringence with applied voltage. Intermediate voltage values between the on and off state voltage values can produce analog gray scale. The FLCDs are bi-stable devices and hence they would only have the two states discussed (i.e., on and off).

At any instance in time during image formation, a particular electrical on and off state pixel pattern corresponds to the image information that is imparted on the light 46A, 46B, 46C upon reflection from the imagers 38A, 38B, 38C. This pattern is transformed into a pattern of polarization states of different bundles of the light 46A, 46B, 46C (i.e., into polarization-encoded bundles of the reflected light 46A, 46B, 46C). The color-separated image information in the image light 46A, 46B, 46C is then combined by the color separator 40. The bundles of the light 46A, 46B, 46C traveling from the rear unit 16 toward the front unit 14 are then selected according to their polarization state by the reflecting linear polarizer 32. Image light that had its polarization rotated substantially by 90° by the imagers 38A, 38B, 38C is substantially transmitted through the reflecting linear polarizer 32 as light 48. Light (not shown) whose polarization was not substantially rotated is reflected by the reflecting linear polarizer 32 and out of the projection lens 12, back toward the illumination subsystem. The reflected light travels essentially the same path in reverse of the path that the incoming light took from the light source in the illumination subsystem. This reflected light could be used for optical pumping of the light source for improved efficiency in the illumination subsystem, in similarity to the discussion above.

The transmitted light 48 has substantially the second polarization orthogonal to the previously desired (first) polarization of incoming light that was reflected by the reflecting linear polarizer 32 toward the imagers 38A, 38B, 38C. The light 48, therefore, passes through the reflecting linear polarizer 32 and through the clean-up element 34, if present. Characteristic directions of the clean-up element 34 and the reflecting linear polarizer 32 are aligned for this transmission, and the clean-up element 34 selects the polarization further. The light 41 then passes through the front lens unit 14 toward the screen 36 as image light 49, which forms a full color image projected thereon (see FIGS. 1 and 2). The nominal throw of the projection lens 12 to the screen 36 (i.e., the distance between them) is approximately 447 mm in air in the exemplary embodiments in FIGS. 1–4. Other embodiments can be designed with different throw distances. The magnification to the screen 36 is approximately 26, although other magnifications could be designed, as will be appreciated by those skilled in the art having the benefit of the present disclosure. The magnification to the screen 36 is approximately 26, although other magnifications could be designed, as will be appreciated by those skilled in the art. With the use of optical designs of different angular magnifications in the front and rear groups, the light can be imaged onto screens of different sizes. For example, the front lens unit can exhibit high angular magnification for wide field projection.

The projection lens 12 advantageously exploits the light output from the illumination subsystem that is imaged onto the imagers 38A, 38B, 38C by being telecentric or substantially telecentric in object space. Moreover, the numerical aperture (NA) of the projection lens 12 is nominally high. In the exemplary embodiments shown in FIGS. 1–4, the projection lens 12 has an NA of approximately 0.1786, which is equivalent to an F/# of approximately 2.8 in air. The projection lens 12 could be designed to have other NA values.

Table 1 summarizes nominal projection lens 12 data for the exemplary embodiments shown in FIGS. 1–4.

TABLE 1

Figure 4A:
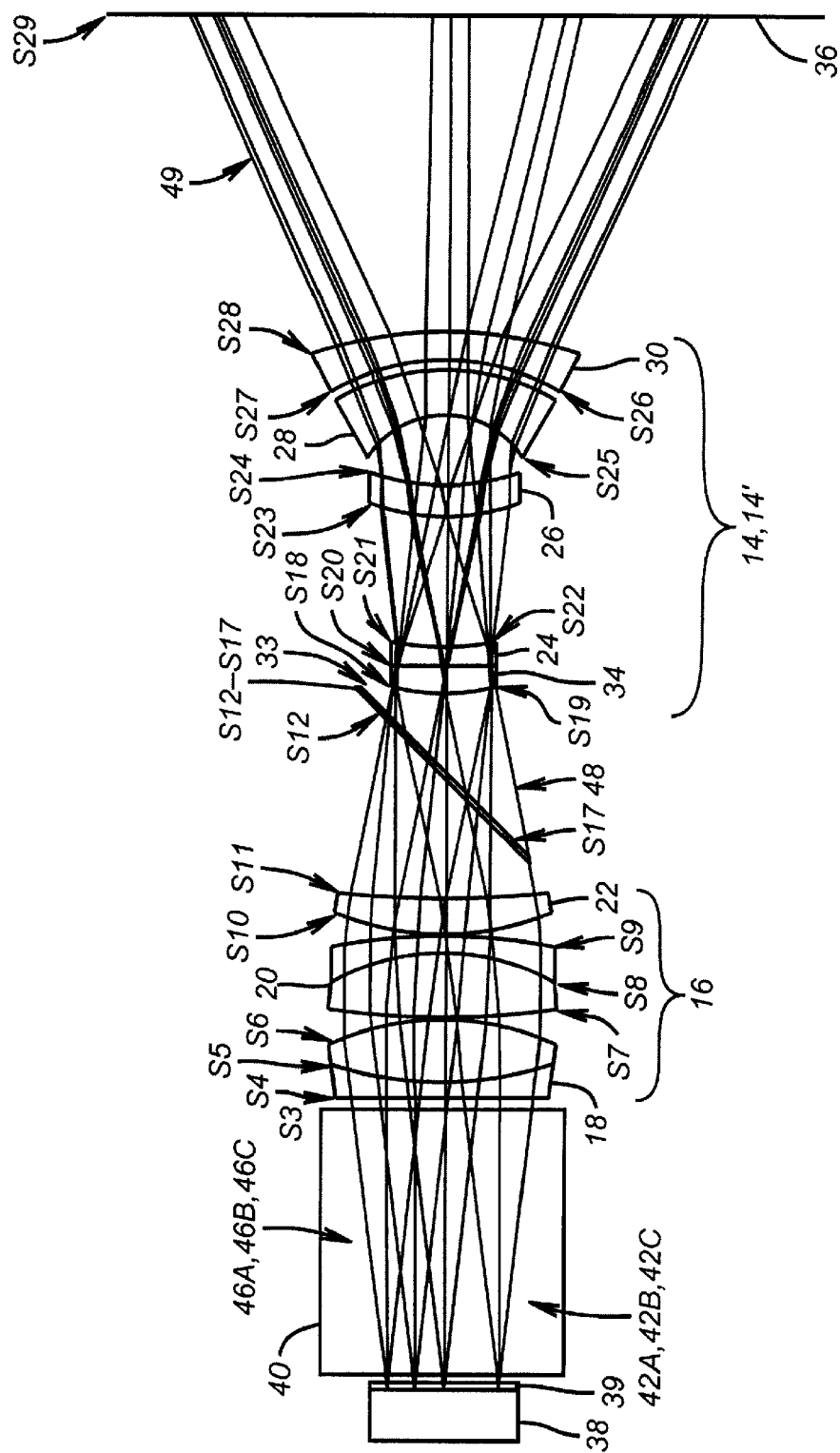
FIG. 4A provides a key between element surfaces and reference numerals in FIG. 1.

| GENERAL PROJECTION LENS DATA | |
|---|---|
| Operating Temperature (C) | 0°–60° C. |
| Stop | S18 [FIG. 4A and Table 2] |
| Stop Diameter | 16 mm |
| Eff. Focal Length | 18 mm |
| Object Space NA | 0.1786 |
| Image Diagonal | 542 mm |
| Magnification | 26.25 |
| Entrance Pupil Position | ∞ (telecentric) |
| Exit Pupil Diameter | 6.5 mm |
| Exit Pupil Position | −473 from image |
| Object Diagonal | 20.6 mm |
| Wavelength Band | Visible |
| Lens Units | Millimeters |

Table 2 is a summary of the projection lens 12 surface data for the exemplary embodiments shown in FIGS. 1–4. The columns in Table 2 are for surface number, surface radius, thickness (i.e., distance between the surface indicated in a row of Table 2 and the surface indicated in the next row), glass/material (e.g., glass or other material or material parameters), diameter, and conic (for aspheric surfaces). FIG. 4A associates the element surfaces in the second column of Table 2 with the numerical elements in the first column of Table 2 and shown in FIGS. 1–3. Surfaces S13–S16 represent interior surfaces of the exemplary glass/optical cement/MOF/optical cement/glass embodiment of the reflecting linear polarizer 32 and are not specifically identified in FIG. 4A. Table 2 includes surfaces S19–S22 for the clean-up element 34, although the clean-up element 34 is optional.

Table 3 includes higher order aspheric coefficient entries for the aspheric surfaces S23 and S27 of the lens elements 26 and 30, respectively, decentering information for the surface S19, and tilt information for the surfaces S12 and S17.

Figure 5:
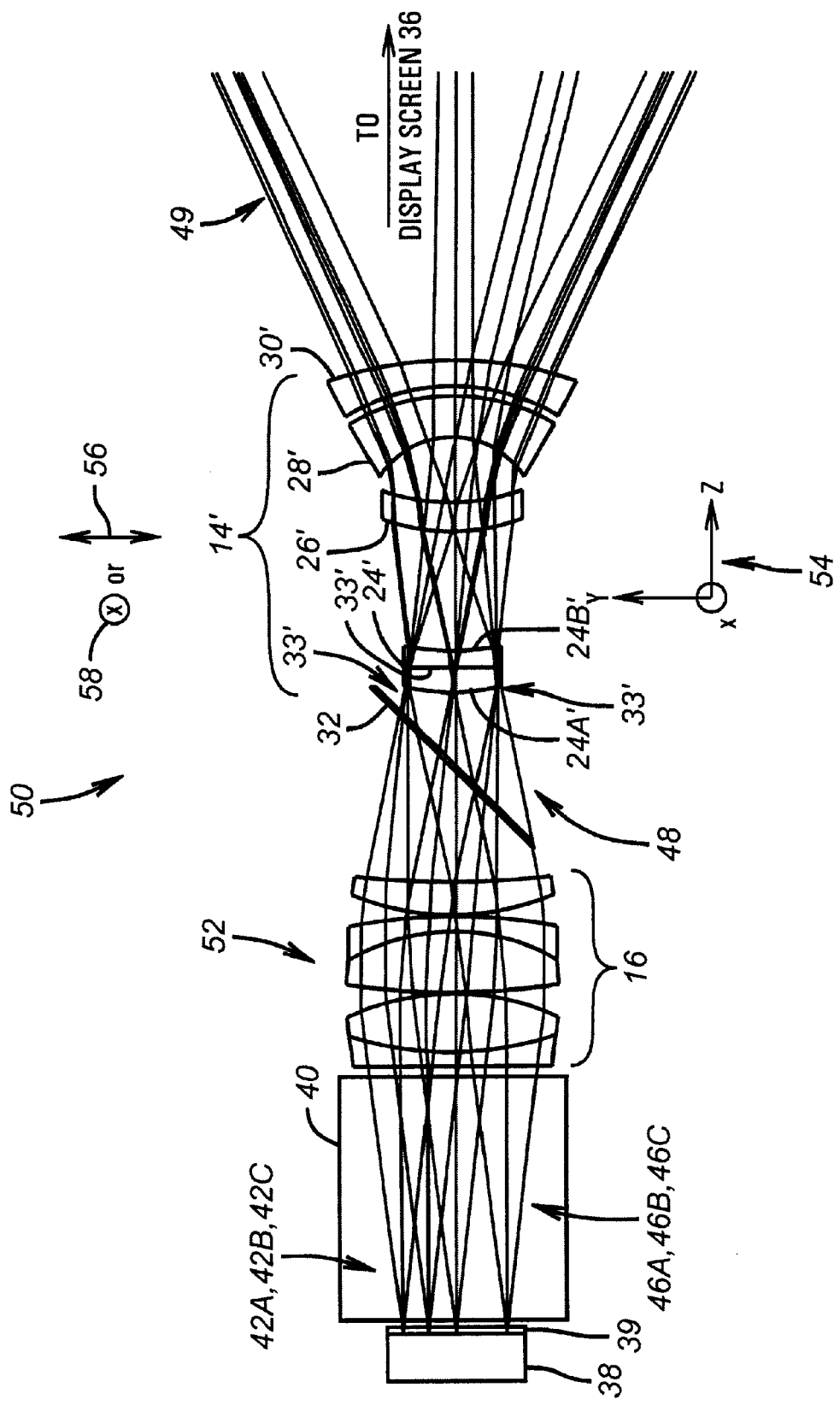
FIG. 5 is a view of a projection lens system in accordance with a second embodiment of the invention.

FIG. 5 shows a projection lens system 50 in accordance with a second embodiment of the invention. The system 50 is similar to the projection lens system 10, and is a variation of the projection lens system 10. A projection lens 52 includes a front or first lens unit 14', which is similar to the lens unit 14 in the lens 12. The front lens unit 14' includes lens elements 24', 26', 28', and 30'. An optional clean-up element 34' can be sandwiched between lens elements 24A' and 24B' of which the lens element 24' is constructed. The front lens unit 14' also includes a remote aperture stop 33'. The elements 24' (24A' and 24B' ) 26', 28', 30', 33', and 34' are analogous or similar to the elements 24 (24A and 24B), 26, 28, 30, 33, and 34, respectively, in the projection lens 12. The system 50 further includes the imager 38 and the chromatic separator 40.

TABLE 2

PROJECTIONS LENS SURFACE DATA SUMMARY

| Dwg. Element No. | Surf No. | Radius | Thickness | Glass/Material | Diameter | Conic |
|---|---|---|---|---|---|---|
| 38 | OBJECT AT IMAGER | Infinity | 1.1 | ZKN7 | 22.4 | |
| | S1 | Infinity | 0.8 | | 22.4 | |
| 40 | S2 | Infinity | 40 | BK7 | 36.72 | |
| | S3 | Infinity | 1.5 | | 36.72 | |
| 18 | S4 | Infinity | 2.5 | SF11 | 37.6 | |
| | S5 | 58.57127 | 8.8 | SK5 | 37.6 | |
| | S6 | −44.27827 | 0.5 | | 37.6 | |
| 20 | S7 | 102.6493 | 9.4 | SK5 | 37.6 | |
| | S8 | −34.32682 | 2.5 | SF11 | 37.6 | |
| | S9 | −101.7558 | 0.5 | | 37.6 | |
| 22 | S10 | 45.26133 | 5.1 | BK7 | 36 | |
| | S11 | 142.304 | 17.704 | | 36 | |
| 32 | S12 | — | 0 | | — | |
| | S13 | Infinity | 0.7 | BK7 | 37.5 | |
| | S14 | Infinity | 0.125 | index 1.580000 Abbe number 58.000 | 37.1 | |
| | S15 | Infinity | 0.7 | BK7 | 37 | |
| | S16 | Infinity | 0 | | 36.6 | |
| | S17 | — | 12.596 | | — | |
| 33 | Stop S18 | — | 0 | | 16 | |
| 24, 34 (520, S21) | S19 | 27.40444 | 4 | BASF2 | 20 | |
| | S20 | Infinity | 0.125 | index 1.450000 Abbe number 58.000 | 20 | |
| | S21 | Infinity | 2.65 | BASF2 | 20 | |
| | S22 | 51.24619 | 19.2 | | 20 | |
| 26 | S23 | 30.24837 | 4.5 | ACRYLIC | 29.4 | 0.41940 |
| | S24 | 33.3 | 10.5 | | 29.4 | |
| 28 | S25 | −14.45517 | 6.8 | BK7 | 24.8 | |
| | S26 | −35.82717 | 1.55 | | 37.6 | |
| 30 | S27 | −26.2 | 4.3 | ACRYLIC | 45 | −1.5309 |
| | S28 | −66 | 447 | | 45 | |
| 36 | SCREEN IMAGE S29 | Infinity | — | | 577.872 | |

TABLE 3

NOTE: System is substantially telecentric or telecentric in object space

| Dwg. Element No. | Aspheric Surface | $A(y^4)$ | $B(y^6)$ | $C(y^8)$ | $D(y^{10})$ |
|---|---|---|---|---|---|
| 26 | S23 | −1.28E-5 | −2.83E-8 | 4.1E-11 | −5.0E-14 |
| 30 | S27 | 4.67E-6 | 1.77E-8 | −4.57E-12 | −2.92E-14 |

Surfaces S18 Y decentered 0.533 mm
Surfaces S12 & S17 tilted 45° and −45° respectively The front lens unit 14' is laterally adjustable as a group with respect to the remainder of the projection lens 50. Lateral adjustment can be made by decentering along X and Y axes in a right-handed coordinate system 54 shown in FIG. 5. The direction of motion is also generally indicated by the double-headed arrow 56 parallel to the Y axis and the orthogonal arrowhead/tail 58 parallel to the X axis.

Figure 6A:
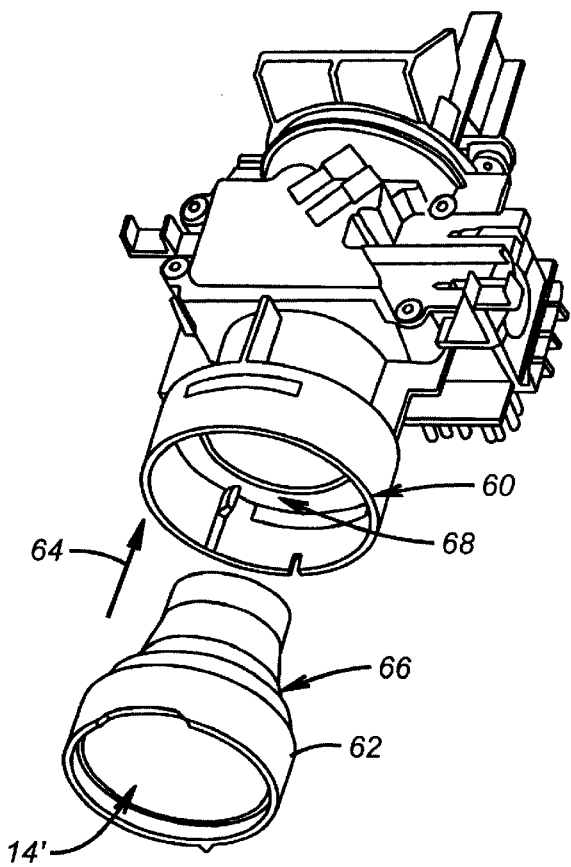
FIGS. 6A and 6B are detailed views of a portion of a projection lens system in accordance with an exemplary embodiment of the projection lens system in FIG. 5.
Figure 6B:
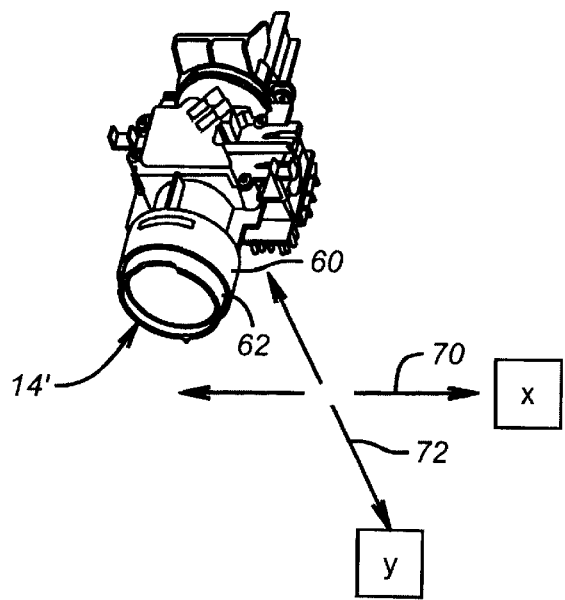

The purpose of decentration is to mitigate possible effects of manufacturing tolerances within the projection lens 50 to improve image quality. The mechanism for decentration in the embodiment shown in FIG. 5 could be implemented in various configurations, as will be appreciated by those skilled in the art having the benefit of the present disclosure. One exemplary mechanism is shown in FIGS. 6A and 6B in accordance with an embodiment of the invention. FIGS. 6A and 6B show a portion of a housing 60 of the front lens unit 14' of the projection lens 52. In this embodiment, the front lens unit 14' is constructed as a modular barrel 62 that installs into the housing 60 in a direction generally indicated by arrow 64. When the front lens unit 14' is fully inserted into the housing 60 (FIG. 5B), flat 66 rests on flat 68. The housing 60 can be articulated along axes 70 and 72 by suitable adjustment known in the art (e.g., by screw adjustment). In one exemplary embodiment, the barrel 62 is manipulated with an external device (not shown), such as a screwdriver, until the optical characteristics of the projection lens 52 are measured for best performance. The barrel 62 is then glued in place with an appropriate glue.

Figure 7:
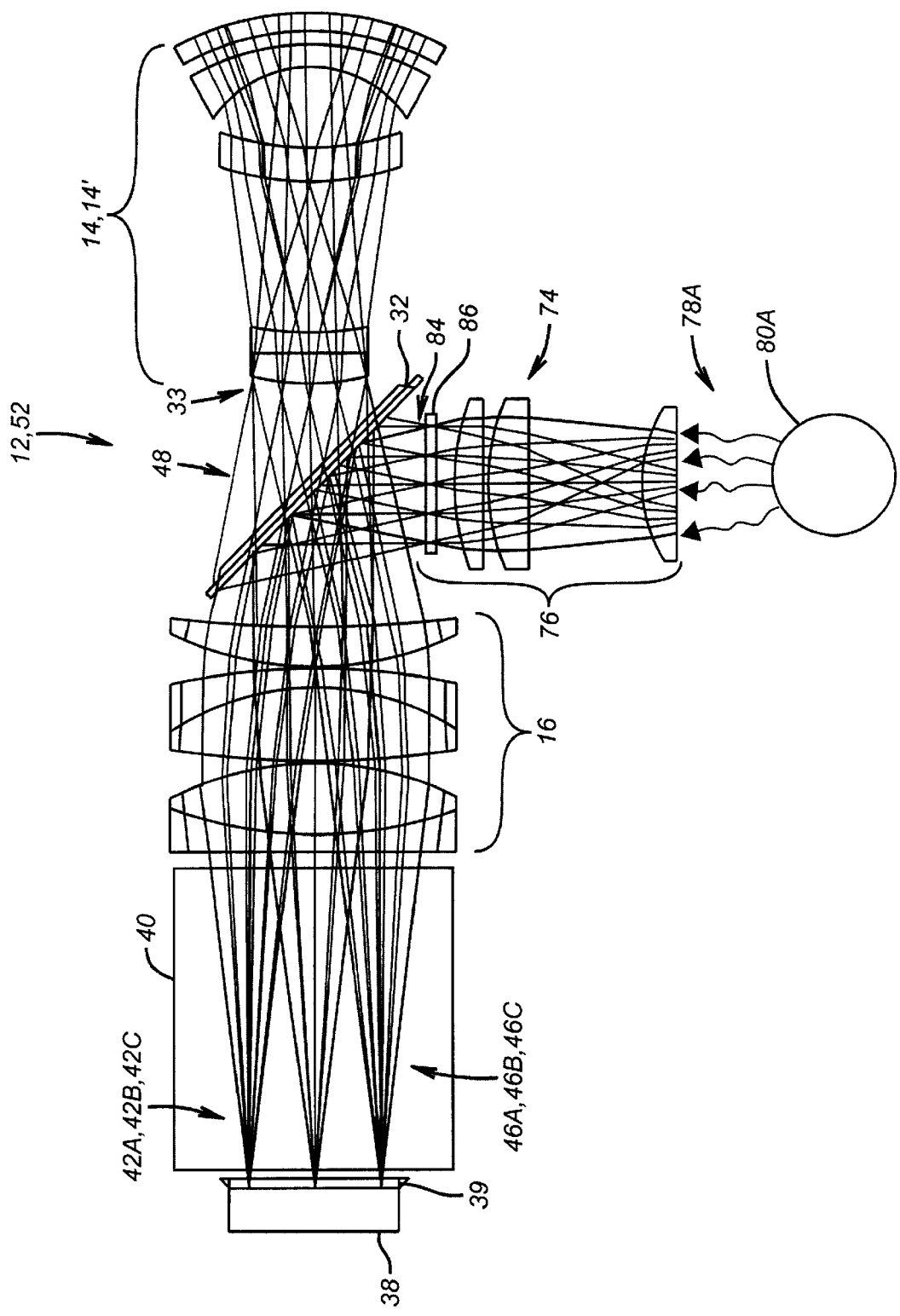
FIG. 7 is a view of a projection lens system with an illumination subsystem including an illumination relay lens system in accordance with an exemplary embodiment of the invention.

In accordance with an embodiment of the invention, an illumination subsystem includes an illumination relay lens system for introducing light from a light source to the projection lenses 12, 52. One exemplary embodiment including such an illumination subsystem 74 is illustrated in FIG. 7. An illumination relay lens system 76 receives light from a light source 78A. The illumination relay lens system 76 directs light out put from the light source 78A to the reflecting linear polarizer 32 in the projection lenses 12, 52. The rear lens unit 16 in the projection lenses 12, 52 is common to light paths of th e illumination subsystem 74 (or other types of illumination subsystems discussed herein) and the projection lens systems 10, 50. Th e magnification of the illumination relay lens system 76 is approximately two in one embodiment. In other embodiments, the illumination relay lens system 76 may include one or more aspheres (e.g., constructed of a polymer, such as acrylic), and may have different magnifications and element powers.

In FIG. 7, the light source 78A includes a lamp 80A and a lamp power drive or power source (not shown). The lamp 80A may be driven by electric arc, radiofrequency (rf) energy, microwave, or like power source and include equipment or hardware (not shown) for coupling power to the light emitting material of the lamp 80A. The lamp 76A can be one of the lamps described in the aforementioned U.S. patent application Ser. Nos. 08/747,190 or 08/771,326, or in U.S. Pat. Nos. 5,404,026, entitled "Lamp Including Sulfur," and U.S. Pat. No. 5,606,220, entitled "Visible Lamp Including Selenium or Sulfur," both issued to Dolan et al., which are incorporated by reference herein in their entirety.

Figure 8:
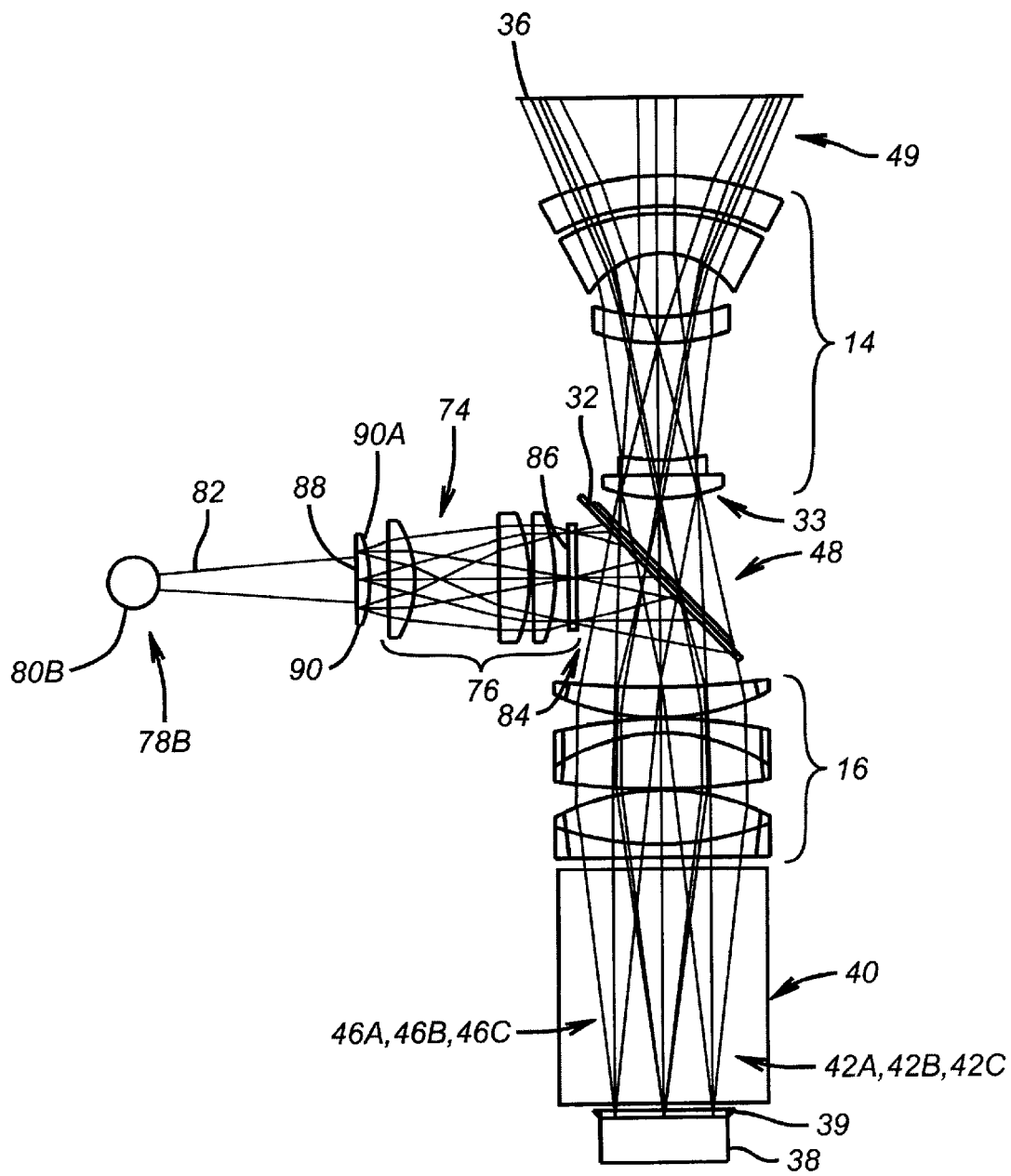
FIG. 8 is a view of a projection lens system with an illumination subsystem including an illumination relay lens system in accordance with a third embodiment of the invention.

FIG. 8 shows a projection system and an illumination subsystem in accordance with a third embodiment of the invention. A light source 78B is similar to the light source 78A and includes a lamp 80B (similar to the lamp 80A) and a liohtpipe (e.g., a tapered lightpipe or TLP) 82, which is a type of lightguide. The lamps 80A, 80B and the TLP 82 will be discussed further below. Like Table 1, Table 4 summarizes general projection lens 12, 52 data and illumination relay lens system 74 data for the embodiment shown in FIG. 8. Table 5 is a summary of the projection lens 12 (and 52) surface data for FIG. 8, in similarity to Table 2.

Figure 8A:
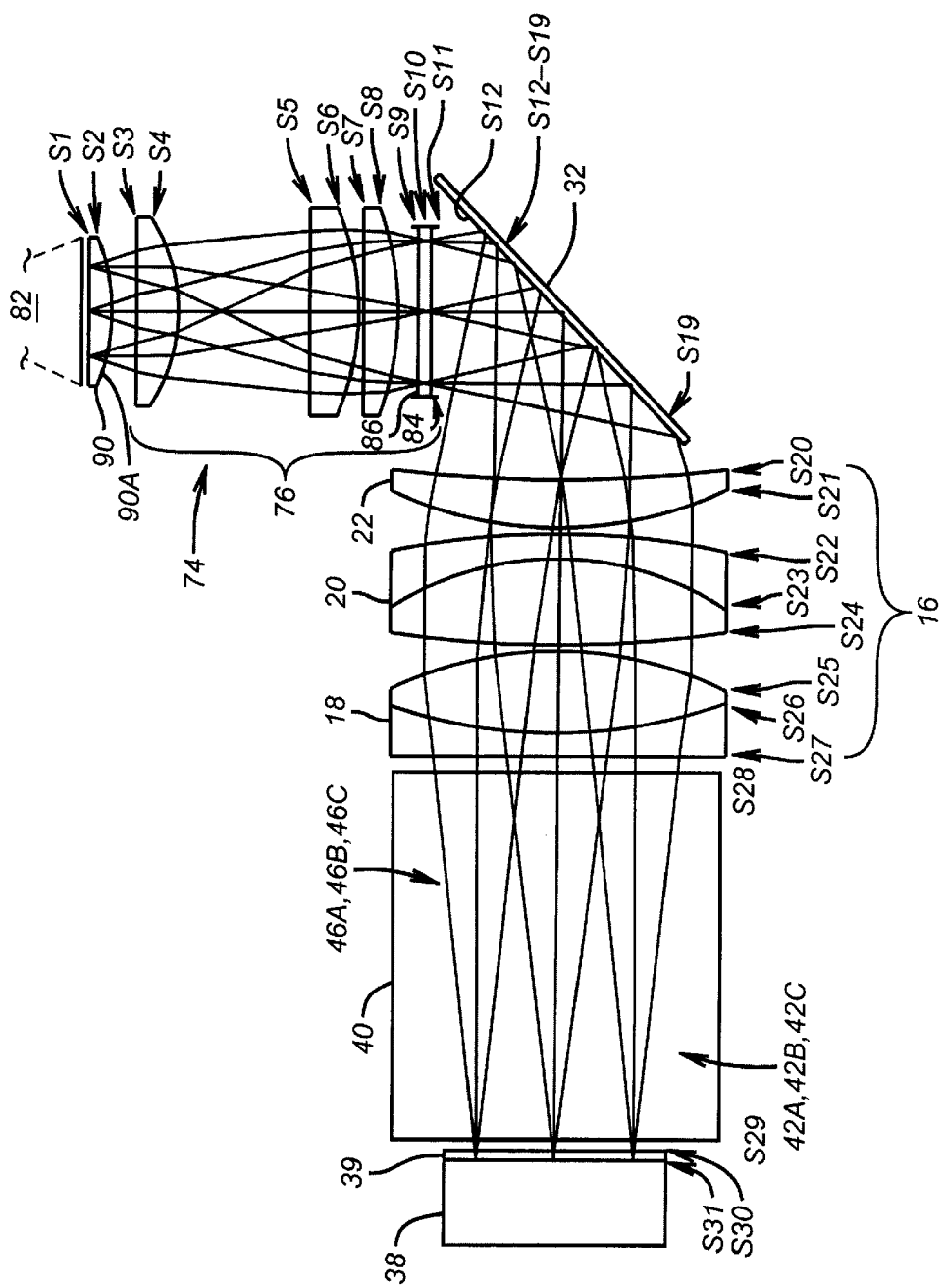
FIG. 8A provides a key between element surfaces and reference numerals in FIG. 8.

FIG. 8A associates the element surfaces in the second column of Table 5 with the numerical elements in the first column of Table 5 and shown in FIG. 8. Surfaces S13–S18 represent interior surfaces of the exemplary embodiment of the reflecting linear polarizer 32 and are not specifically identified in FIG. 8A, as similarly discussed above for FIG. 4A. No meaning should be attached to the use of similar element surface numerical labels between the embodiments shown in Table 2 (and FIG. 4A) and Table 5 (and FIG. 8A).

TABLE 4

GENERAL LENS DATA

| No. Surfaces | 30 |
| --- | --- |
| Temperature (C) | 0°–68° C. |
| Object Space N.A. | 0.32 |
| Eff. Focal Length | −172 mm |
| Working F/# | 2.65 |
| Stop Diameter | 16 mm |
| Paraxial Magnification | −1.78 |
| Object Height in Millimeters | 12.5 mm diagonal |
| Primary Wavelength | 0.556 microns |
| Lens Units | Millimeters |

The illumination relay lens system 76 is designed to accommodate the extent or size of the light output from the TLP 82. In a particular embodiment, the TLP 82 and the imager 36 are not substantially adjustable relative to each other while their adjustment can be made in other embodiments or in other ways in still other embodiments. For example, an illumination field stop 83 (see FIGS. 7, 7A, and 8) can be laterally adjusted to allow light passing from the light sources 78A, 78B to the imager 38 to be centered on the imager 38. The field stop 83 can be a rectangular field stop.

In the exemplary embodiment shown in FIG. 8, a pre-polarizer 86 is also included in an aperture stop 84. The pre-polarizer 86 can be a multi-layered or sandwiched structure in a heat-sink frame, such as layers of DBEF (or MOF), glass, air, sapphire, and an absorption polarizer (e.g., with optical cement in between each adjacent layer). The sapphire acts as a heat collector and the pre-polarizer 86 can be AR-coated. With this construction, the sapphire layer may be used advantageously as a heat sink, depending on the design of the light source 78A, 78B. The MOF layer of the pre-polarizer 86 may be used to reflect light of an undesired polarization (i.e., polarization not aligned for reflection to the imager 38 by the reflecting linear polarizer 32) back to the lamp 80B for optical pumping, as discussed above, as well as to limit the amount of light absorbed by the absorption polarizer to minimize heating effects. On the other hand, the MOF layer transmits light of the desired polarization (i.e., polarization aligned for reflection to the imager 38 by the reflecting linear polarizer 32).

The illumination relay lens system 76 may also include an IR/UV filter or coating 88 on a lens 90. Infrared filtering can reduce or substantially mitigate detrimental thermal effects from high powered lamps in imaging systems. Ultraviolet filtering can reduce or substantially mitigate degradation of optical bonding materials (e.g., optical cements or epoxies) if they are used in the projection lens systems 10, 50. The IR/UV filter 88 shown in FIG. 8 reflects near-visible IR radiation from the light source 78A, 78B away from the projection lenses 12, 52 and back toward the lamp 80B. The IR radiation above approximately 1.2 microns is absorbed by the absorption polarizer in the IR/UV filter 88. In alternative embodiments, only an IR or a UV filter (i.e., not both), or no filter, may be used. The IR/UV filter 88 (or separate IR or UV filters) could be in other positions, as will be appreciated by those skilled in the art having the benefit of the present disclosure. For example, the filter 88 could be a UV filter or a UV coating on the lens 90 and an IR mirror could be placed near or in the middle of the illumination relay lens system 76 between the lenses 74A and 74B in FIGS. 7, 8 and 8A. With an IR (hot) mirror, UV could be absorbed and so there may be no need for a separate UV filter or coating.

TABLE 5

ILLUMINATION RELAY SYSTEM SURFACE DATA SUMMARY

| Dwg. Element No. | Surface No. | Radius | Thickness | Glass/Material | Diameter | Conic |
| --- | --- | --- | --- | --- | --- | --- |
| e.g., 82 | OBJECT (e.g., TLP OUTPUT) | Infinity | 0.005 | | 12.5 | 0 |
| 90 | S1 | Infinity | 2.3 | SILICA | 16 | 0 |
| 90, 90A | S2 | −25.2 | 2.877403 | | 16 | 0 |
| 76 | S3 | Infinity | 4.5 | BK7 | 20 | 0 |
| | S4 | −18.59391 | 14.45 | | 20 | 0 |
| | S5 | Infinity | 5.5 | BK7 | 22 | 0 |
| | S6 | −27.77859 | 0.5 | | 22 | 0 |
| | S7 | Infinity | 3.7 | BK7 | 22 | 0 |

TABLE 5-continued

ILLUMINATION RELAY SYSTEM SURFACE DATA SUMMARY

| Dwg. Element No. | Surface No. | Radius | Thickness | Glass/Material | Diameter | Conic |
|---|---|---|---|---|---|---|
|  | S8 | −34.7788 | 2.22 |  | 22 | 0 |
| 86 | S9 | Infinity | 1.5 | BK7 | 18 | 0 |
|  | S10 | Infinity | 0 |  | 18 | 0 |
| 84 | STOP 11 | Infinity | 14.35 | — | 16 | — |
| 32 | S12 | — | 0 | — | — | — |
|  | S13 | Infinity | 0.7 | BK7 | 36.52763 | 0 |
|  | S14 | Infinity | 0 | MIRROR | 37.41535 | 0 |
|  | S15 | Infinity | −0.7 | BK7 | 37.41535 | 0 |
|  | S16 | Infinity | 0 |  | 38.30535 | 0 |
|  | S17 | — | 0 | — | — | — |
|  | S18 | Infinity | −18.225 |  | 23.73374 | 0 |
|  | S19 | — | 0 | — | — | — |
| 22 | S20 | 142.304 | −5.1 | BK7 | 37 | 0 |
|  | S21 | 45.26 | −0.5 |  | 37 | 0 |
| 20 | S22 | −101.755 | −2.5 | SF11 | 37.5 | 0 |
|  | S23 | −34.326 | −9.4 | SK5 | 37.5 | 0 |
|  | S24 | 102.649 | −0.5 |  | 37.5 | 0 |
| 18 | S25 | −44.278 | −8.8 | SK5 | 37.5 | 0 |
|  | S26 | 58.571 | −2.5 | SF11 | 37.5 | 0 |
|  | S27 | Infinity | −1.5 |  | 37.5 | 0 |
| 40 | S28 | Infinity | −40 | BK7 | 36.72 | 0 |
|  | S29 | Infinity | −0.8 |  | 36.72 | 0 |
| 39 | S30 | Infinity | −1.1 | ZKN7 | 24.75913 | 0 |
| 38 | IMAGE AT IMAGER S31 | Infinity | — |  | 22.93756 | 0 |

Surface S19 Y decentered −0.52 mm
Surfaces S12 & S19 tilted 45°

Figure 9:
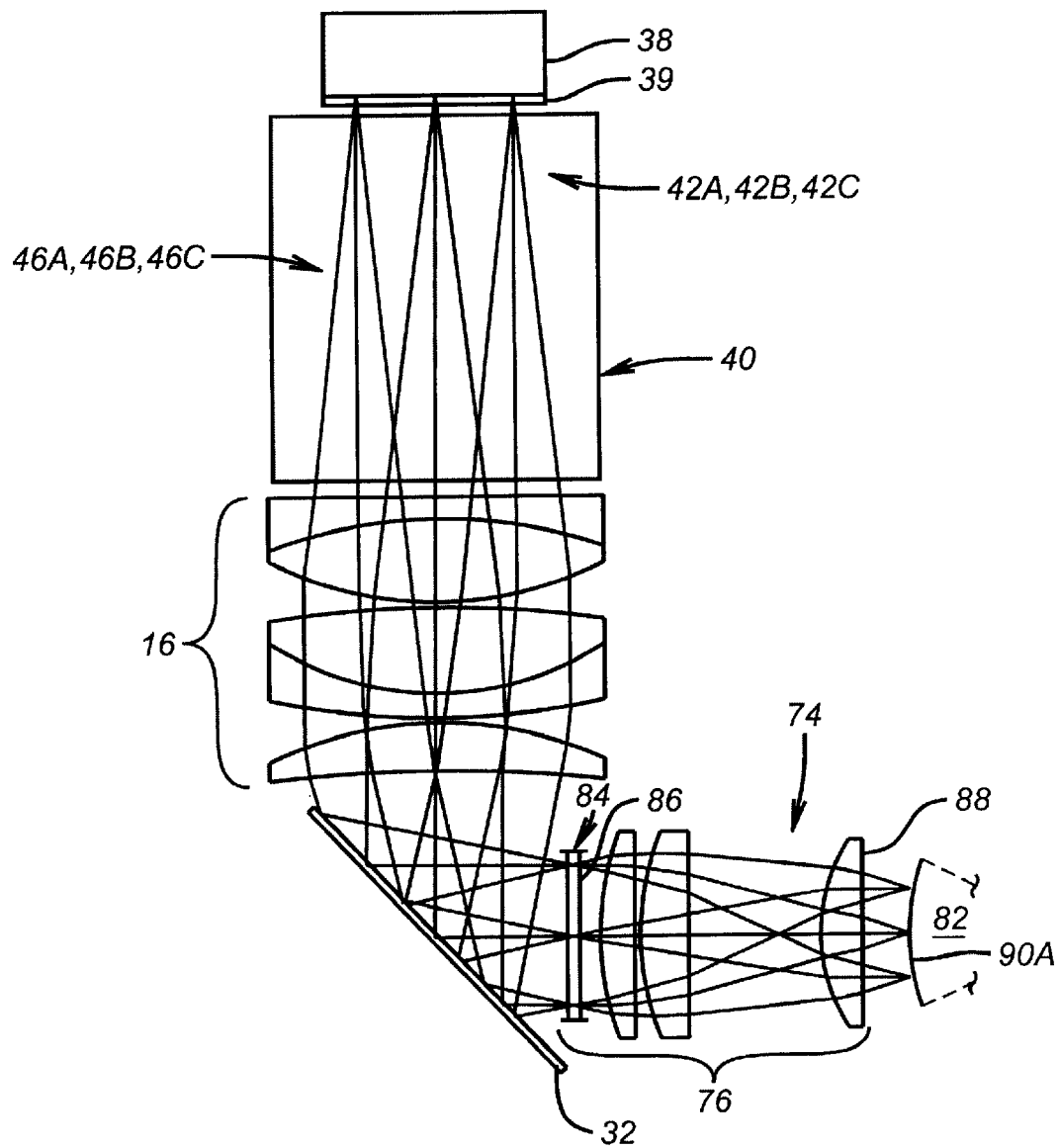
FIGS. 9 and 10 are views of portions of a projection lens system with an illumination subsystem in accordance with exemplary embodiments of the invention.
Figure 10:
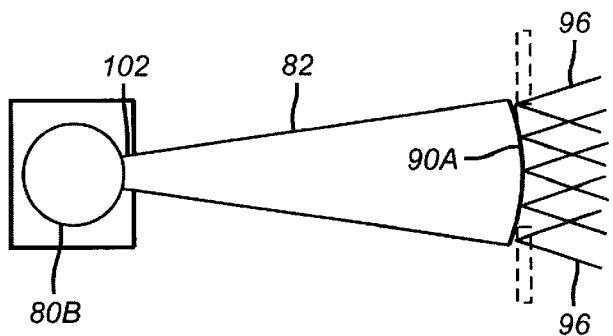

The TLP 82 is four-sided, pyramidal-shaped, and rectangular in cross-section, with flat sides and ends in the exemplary embodiment shown in FIG. 8. The TLP 82, having this structure, is used to "condition" the light, although other shapes could be used. The TLP 82 accepts light from the lamp 80B and guides the light substantially by total internal reflection (TIR), as will be appreciated by those skilled in the art having the benefit of the present disclosure. The light received from the lamp 80B is multiply reflected within the TLP 82 as it undergoes TIR and is output by the TLP 82 to the illumination relay lens system 76. The TLP 82 exhibits TIR because of its shape and its optical and material properties, and because of its orientation for receiving light from the lamp 80B. In FIG. 8, the TLP 82 is shown, bonded to, layered with, or otherwise attached to a lens element 90 (e.g., a positive lens). The lens 90 can also be integral with the TLP 82 in other embodiments. In the exemplary embodiment shown in FIG. 8, the lens element 90 includes a lens surface 90A bonded to the TLP 82 with the UV/IR filter coating 88 in between. It will be appreciated by those skilled in the art having the benefit of the present disclosure that the IR/UV filter or coating 88 could be disposed at other positions within the system 76 or on the surface of the lens element 90 away from the TLP 82. Embodiments, for example, as shown in FIGS. 9 and 10, in which the lens surface 90A is integral with the TLP 82 are simple, low cost, and radiometrically efficient.

In operation, the relay system 76 images the light output from the TLP 82 onto the imager 38. Light is both homogenized and controlled in solid angle by the TLP 82 to allow for simple imaging onto the imager 38 with little loss. The TLP 82 conditions the light output from the lamp 80B to become substantially telecentric light at the imager 38. The light from the TLP 82 is provided at the right NA to the illumination relay lens system 76 to produce the near-telecentric light at the imager 38. In alternative embodiments, a condenser, which is also a light homogenizer, could be used instead of the TLP 82 and the relay system 76. The condenser would form an image of the light source at the entrance pupil of the projection lens, thereby matching the illumination system to the projection system.

Figure 11:
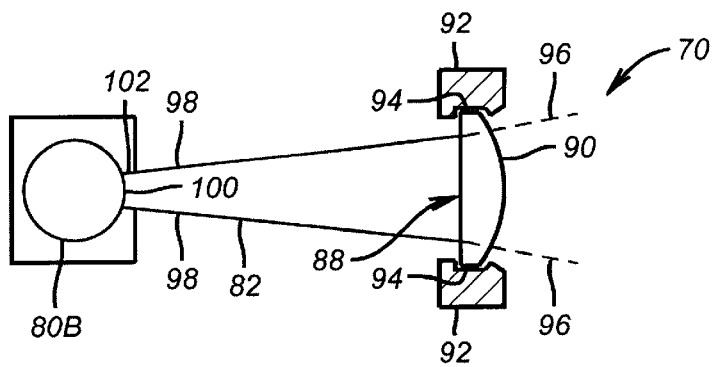
FIGS. 11–14 are views of mounting apparatuses in accordance with exemplary embodiments of the invention.

FIG. 11 illustrates an exemplary mounting apparatus for holding the TLP 82 in accordance with an embodiment of the invention. In FIG. 11, the lens 90 is bonded to the TLP 82 with the IR/UV coating 88 in between. Bonding is made using a suitable optical adhesive. The lens 90 is mounted in the illumination subsystem 74 by mount 92, shown in cross-section in FIG. 11, which can completely encircle the lens 90 along an edge 94 of the lens 90. The lens 90 could be glued or mechanically retained within the mount 92. The mount 92 is completely outside the light cone 96 passing through and out of the TLP 82. The apparatus shown in FIG. 11 is a desirable embodiment, because light loss due to loss of TIR can be reduced or avoided if the TLP 82 were not mounted and, therefore, not contacted on its side 98, or on its end 100. A physical mount 102 at the end 100 is optional. The mount 102 can completely or substantially decouple the TLP 82 from the lamp 80B, which may afford prevention or reduction of possible physical and thermal degradation.

Figure 12:
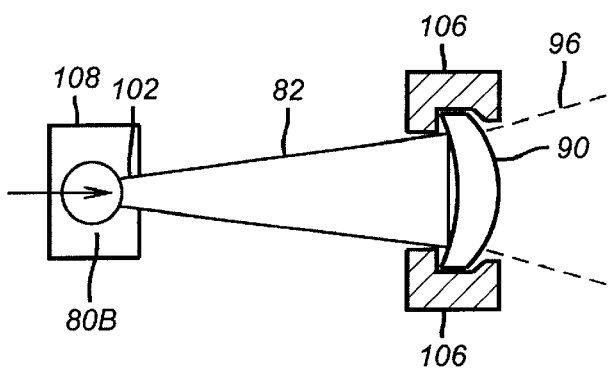
Figure 13:
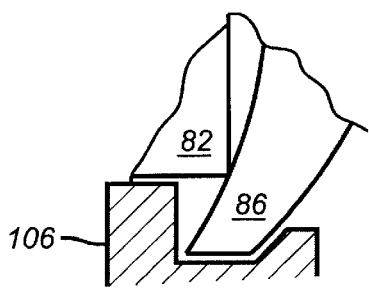
Figure 14:
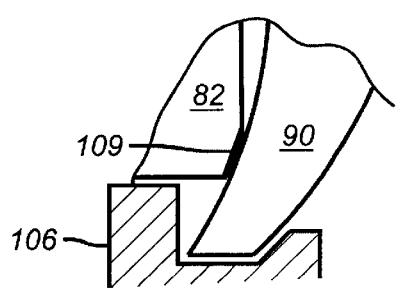

FIGS. 12, 13, and 14 show some variations in ways to mount the TLP 82 in accordance with alternative embodiments of the invention. FIG. 12 illustrates a mount 106 similar to the mount 92 (e.g., it is completely outside the light cone 90 passing through and out of the TLP 82). Physical contact is made between the lamp 80B and/or its housing 108 and the TLP 82. The TLP 82, the mount 106, and the lens 90 are positioned so there is, in general, a force directed toward the lens 90 from the lamp 80B. No adhesive is required between the lens 90 and the TLP 82 or between the lens 90 and the mount 106. The force pushes the TLP 82 against the lens 90 in the mount 106. FIG. 13 shows a detail of the contact made between the TLP 82 and the lens 90. FIG. 14 shows another detail with the TLP 82 including a ground corner region 109 that substantially conforms to the curvature of the lens 90. The exemplary embodiment shown in FIG. 14 may provide improved fragility in the corner region 109, both for the TLP 82 and the lens 90. The UV/IR coating 88 (or only one of them, as discussed above), although not shown in FIGS. 12 or 13, can be disposed in between the TLP 82 and the lens 90.

Figure 15:
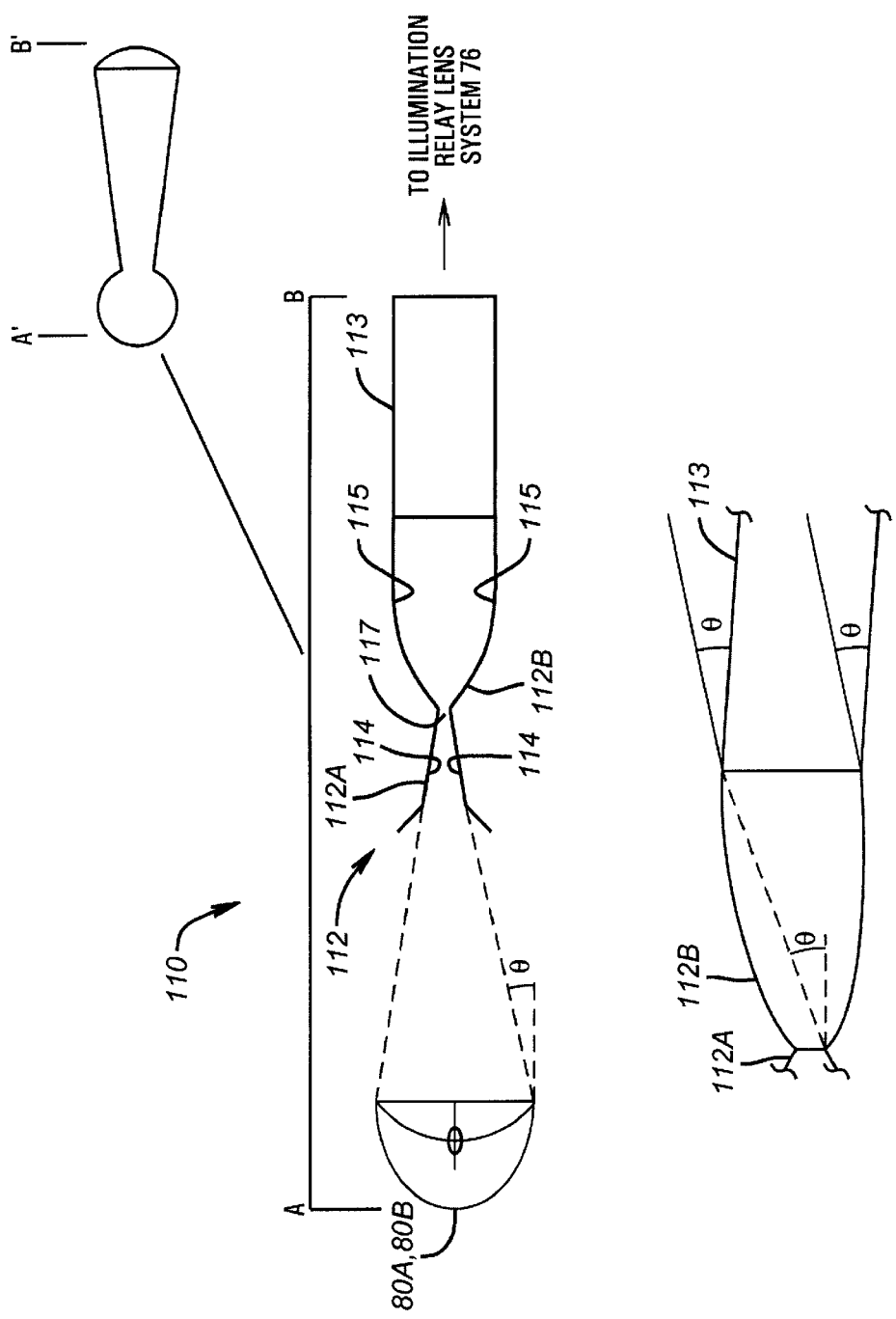
FIG. 15 is a view of a projection lens system with an illumination subsystem in accordance with an alternative embodiment of the invention.

In an illumination subsystem 110 shown in FIGS. 15A and 15B, in accordance with another alternative embodiment of the invention, a light funnel 112A/compound parabolic concentrator (CPC) 112B in a combination 112, having reflective inner surfaces 114 and 115, or other type or shaped lightguide may be employed instead of the TLP 82 in a relay system. A lightpipe (e.g., a non-tapered light homogenizer) 113 is included in the subsystem 110 to homogenize the light received from a light source (e.g., 80A or 80B) that passes through the combination 112 on its way to an illumination relay lens system (e.g., the system 76). The light funnel portion of the combination 112 is a funnel-shaped, reflecting optical element. Devices similar to the CPC 112B and the TLP 82 are described in U.S. Pat. Nos. 5,237,641, 5,243,459, 5,303,322, 5,528,720, 5,557,478, 5,610,768, and 5,594,830, which are incorporated by reference herein in their entirety. The region 117 between the funnel 112A and the CPC 112B is a region of high light energy. The cone angle $\theta$ (see FIGS. 15A and 15B) of the funnel 112A, which determines the cone angle of the light through the lightpipe 113, is preserved at the output of the lightpipe 113, as shown in FIG. 15B. The light output from the CPC 112B is telecentric or substantially telecentric. The angle $\theta$ determines the angle of the cone of light at the output of the illumination relay lens system, and is related to its telecentricity. In certain alternative embodiments, the funnel 112A is not included with the CPC 112B. In still other alternative embodiments, the TLP 82 can be replaced with a system of lenses that may include one or more aspheric surfaces and/or gradient index or diffractive optics that freely image light from the lamp 80B to the imager 38. Such alternative embodiments also provide well behaved, substantially telecentric cones of light to the imager 38. The TLP 82, as well as the illumination relay lens system 76, could also both be replaced by a completely different illumination relay lens system of another design, as will be appreciated by those skilled in the art having the benefit of the present disclosure. All of these embodiments image light from the lamp 80B onto the imager 38, providing substantially telecentric and uniform light. Moreover, the TLP 82, as well as these other types of lightguides and relay lens systems, beneficially allows for the use of an arc lamp, such as a metal halide lamp, or other lamp types. They also provide high efficiency for high illumination brightness and uniformity.

As mentioned above, in accordance with embodiments of the invention, the illumination subsystem 74 and the imager 38 light can be adjusted relative to each other. In one embodiment, the position of the TLP 82 can be adjusted by simple mechanical adjustment (e.g., by a screw adjustment) relative to the illumination relay lens system 76. For example, the TLP 82 can be laterally or angularly adjusted relative to the system 76, which controls the cones of the light impinging on the imager 38 to also move laterally or angularly, as will be appreciated by those skilled in the art having the benefit of the present disclosure.

Figure 16:
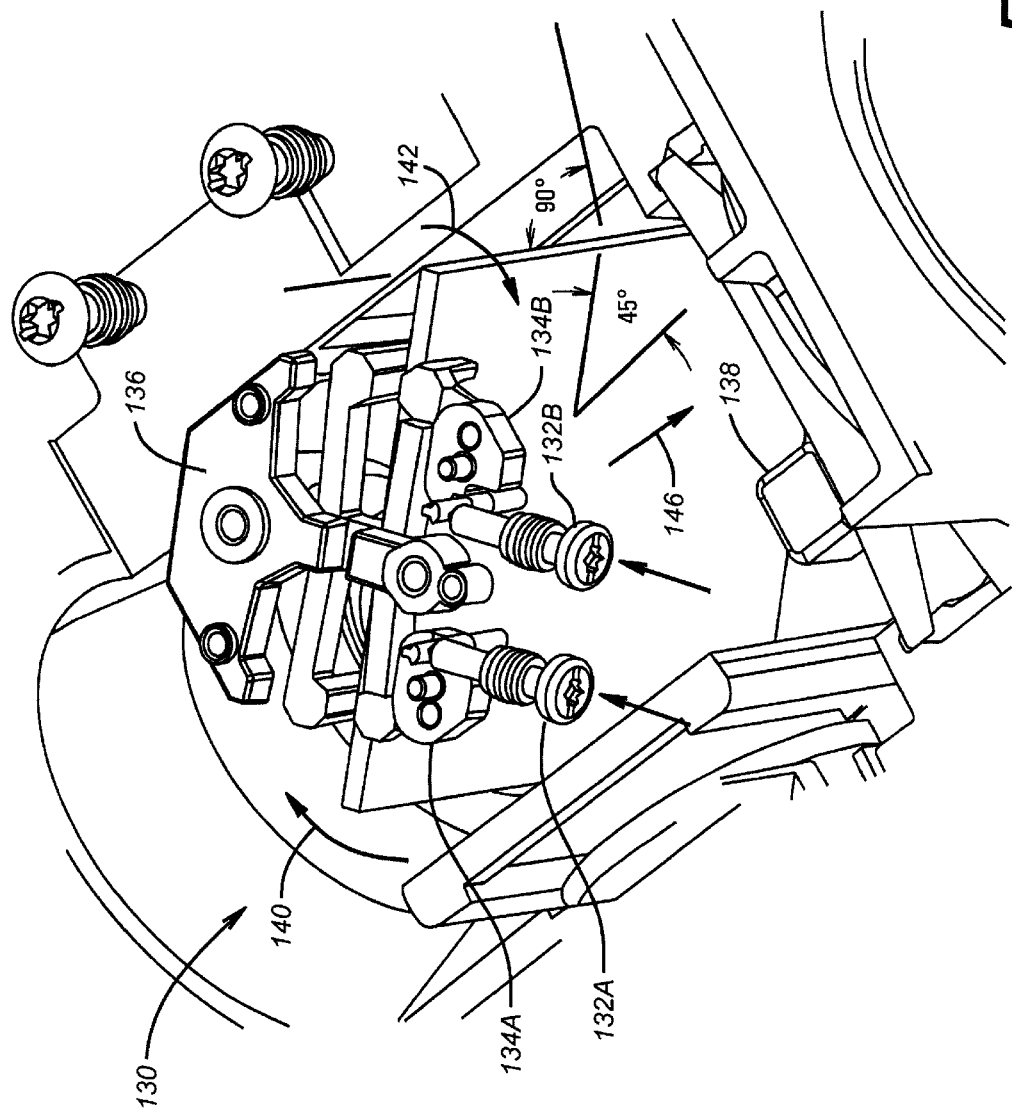
FIGS. 16 and 17 are views of details of portions of a projection lens system in accordance with exemplary embodiments of the invention.
Figure 17:
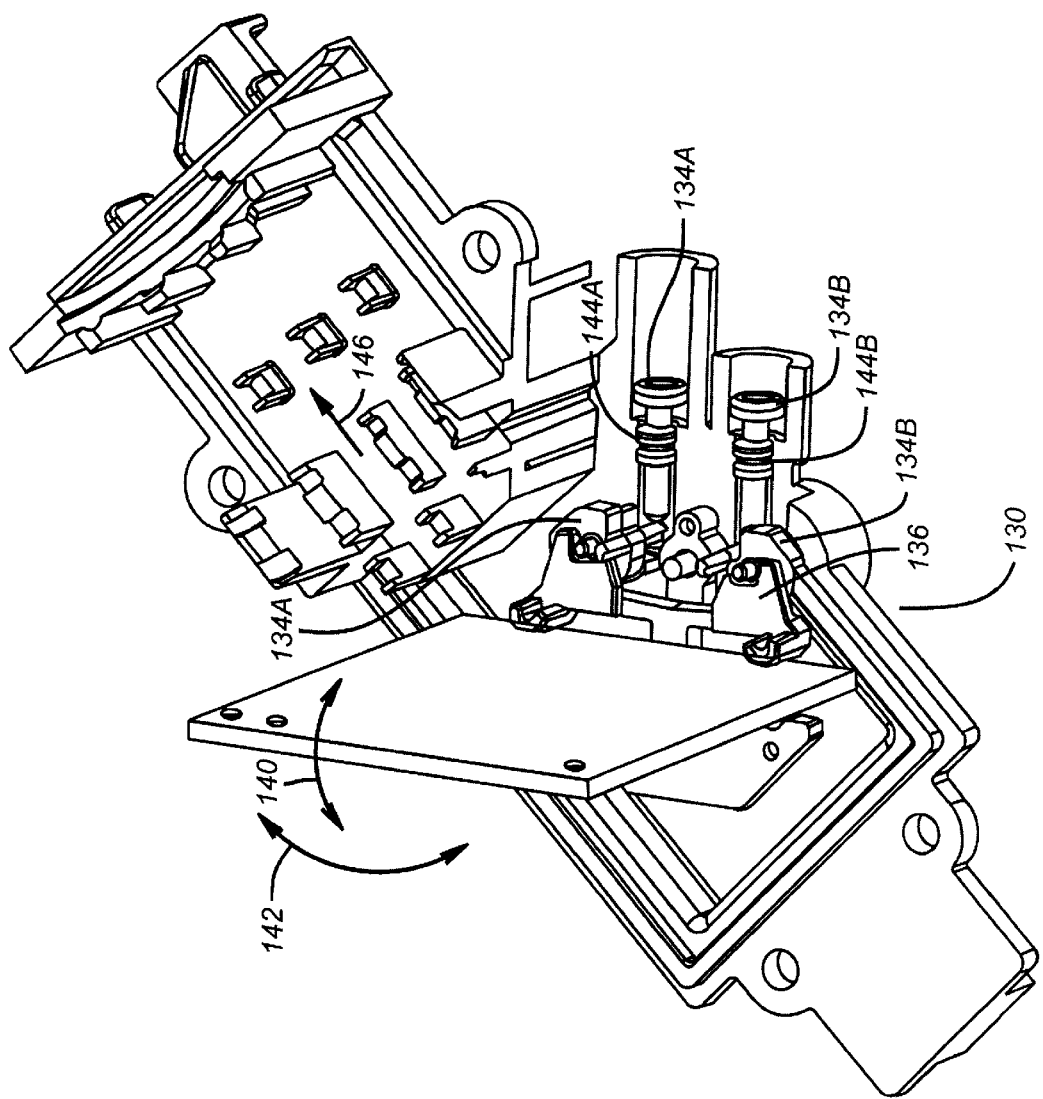

In another embodiment shown in FIGS. 16 and 17, the reflecting linear polarizer 32 can be adjusted about one or more axes of rotation to adjust the illumination subsystem 74 (and hence, the TLP 82) and the imager 38 relative to each other. In this embodiment, the adjustable field stop 83 is not needed to adjust the illumination on the imager 38, and is not necessarily present. This will allow the substantially telecentric light received from the illumination subsystem 74 via the illumination relay lens system 76 to be adjusted on the pixel faces of the imager 38. Adjustment of the polarizer 32 can be used to optimize the coupling of light between the output of the TLP 82 and the imager 38. Moreover, as with adjustment of the front lens unit 14' (see FIG. 5), adjustment of the polarizer 32 can be used to compensate for manufacturing or mounting tolerances.

In more detail, FIGS. 16 and 17 show a beamsplitter adjustment device 130 that includes adjustment screws 132A, 132B, adjustment cams 134A, 134B (e.g., 2:1 cams), an adjuster 136, and a pivot 138 (not shown in FIG. 17). The adjustment device 130 can be constructed of molded plastic components attached to the inside of the projection lenses 12, 52 (not shown in detail in FIG. 16). The adjustment screws 132A, 132B contact the cams 134A, 134B, respectively. The cams 134A, 134B rotate against the adjuster 136 to rotate or tilt the polarizer 132. Turning both of the adjustment screws 132A, 132B causes a top 32A of the polarizer 32 to tilt up to approximately 1° from a vertical plane as generally indicated by arrow 140. Turning only the adjustment screw 132A causes the polarizer 32 to rotate up to approximately 1° from a 45° plane, as generally indicated by arrow 142. The adjuster 136 also returns the cams 134A, 134B in the corner (i.e., the adjuster 136 holds the cams 134A, 134B in place inside the projection lenses 12, 52). Springs 144A, 144B bias the adjustment screws 132A, 132B against the cams 134A, 134B. Light received by the polarizer 32 can be steered to the imager 38 by adjustment of the adjustment screws 132A, 132B to optimally illuminate the imager 38. The rear lens unit 16 is located in the direction indicated by arrow 146 in FIGS. 16 and 17.

Other modifications besides mechanical adjustment mechanisms for optimizing illumination of the imager 38 can be made to the projection lenses 12, 52 based on other considerations. For example, the lenses 12, 52 and other nominal lens designs are multi-color projection lenses, which may exhibit residual color fringing, also referred to as lateral color. Color fringing is a result of a higher or a lower magnification for one or more colors compared to the other colors in the optical system. For example, red and blue light may image at higher or lower magnification than green light. For light exhibiting lower red and blue magnification, adding a very weak, negatively powered element near the green imager (e.g., 38A, 38B, or 38C) in the green light path or channel can decrease the magnification of the green light to compensate for the magnification differences. Thus, the red, green, and blue light can be substantially and simultaneously matched in magnification to the other colors. Other similar or analogous embodiments for correcting color fringing also use one or more weak lens elements for the red and/or the blue channel in addition to the green channel, or instead of the green channel. More than one color and/or other colors besides red, green, or blue may be corrected. These embodiments and other embodiments that use weak, positive lenses or combinations of weak negative and positive lens elements to decrease or increase the magnification in one or more channels to correct color fringing are included within the scope and spirit of the present invention.

Figure 18:
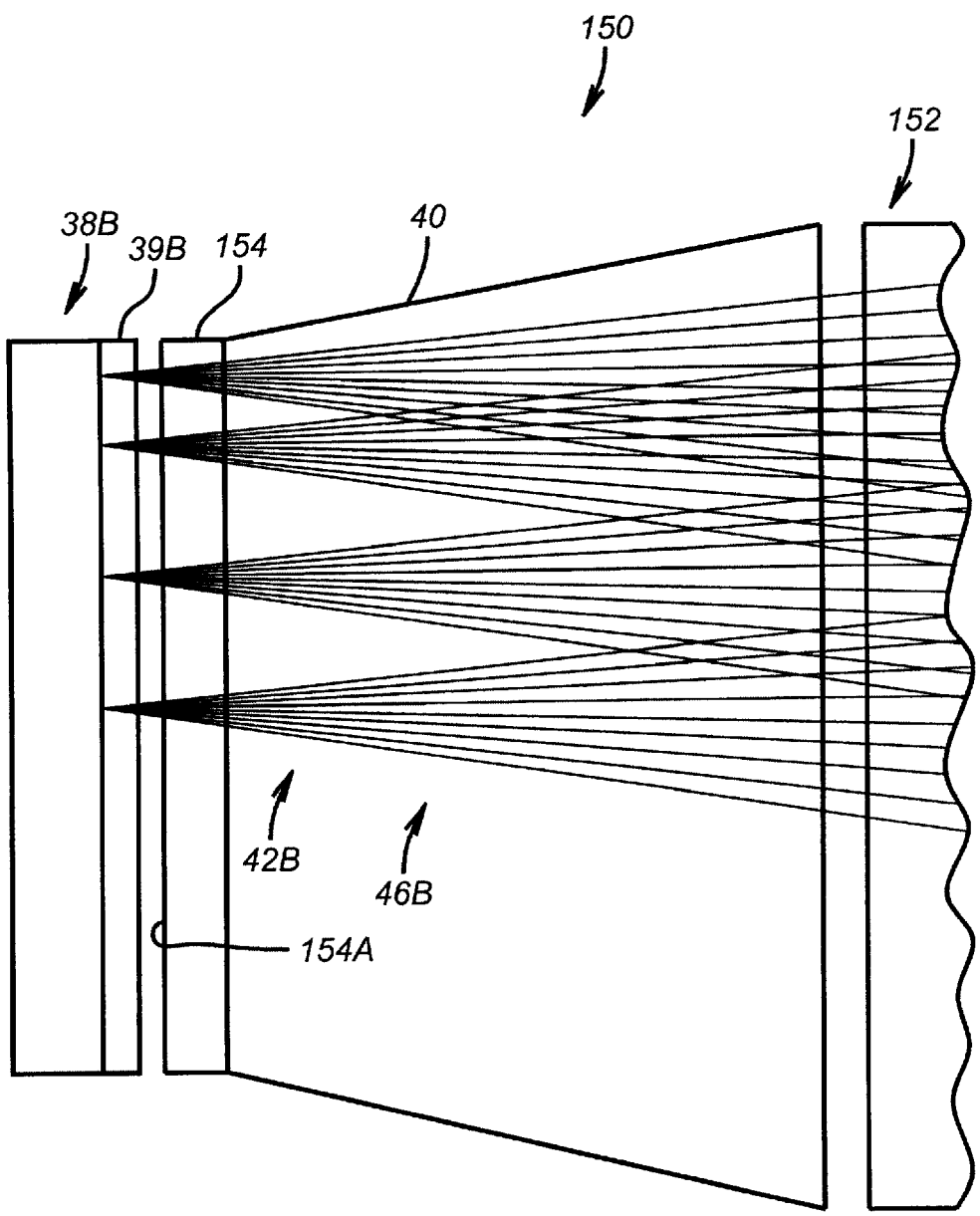

A system for correcting color fringing in one color channel (e.g., the green channel) is shown in FIG. 18 and in FIG. 18A in more detail in accordance with a fourth embodiment of the invention. A projection lens system 150, which is a variation of the projection lens systems 10 and 50, includes a projection lens 152 (shown schematically as a cut-away block in FIG. 18). The system 150 may be similar to the systems 10, 50 (e.g., including the adjustment mechanisms described above), except for the addition of a weak correcting element 154 (e.g., a lens). The weak correcting element 154 is disposed between the color separator 40 (also see FIGS. 1–3) and the one imager of the imagers 38A, 38B, or 38C (in this case imager 38B is illustrated) that is being used to impart the particular color image on the incoming light that needs to be corrected for lateral color. The element 154 can be bonded to (e.g., with an appropriate optical cement) either the chromatic separator 40 or to the cover glass associated with that particular imager. Alternatively, the element 154 can be disposed and held in place between the chromatic separator 40 and the imager by an appropriate mount. The correcting element 154 includes at least one curved surface 154A, which exhibits optical power.

The weak correcting element 154 is used to bring the color to be corrected (e.g., green) into substantial coincidence with the other colors (e.g., red and blue light) upon recombination of the light in the color separator 40 on its way to the front lens units 14, 14'. This is illustrated in FIG. 18 by considering the following. Pixel A on the green imager 38B corresponds to pixel C on the blue imager 38C and to pixel D on the red imager 38A. The projection lens 152 has the lateral chromatic aberration, which is the change in magnification for different colors. The green channel has a larger magnification than the red and the blue channels. To correct this difference in magnification in the projection lens 152, the weak negative lens 154 has been added in front of the green imager 38B. The light 46B coming from the pixel A, which is the correct light, is redirected by the lens 154 such that it appears as if it is coming from the pixel B, which is closer to the center of the imager 38B. In other embodiments, gradient index, aspheric lenses, or diffractive optics could be used for the weak correcting element 154. For example, diffractive optics in the channel for the color to be corrected in the projection lens could be used (e.g., in the rear unit) instead to correct color fringing. Another way to accomplish this is to use a diffractive optical element common for all three color channels.

In the exemplary embodiment shown in FIG. 18, the weak correcting element 154 is used to reduce or eliminate color fringing in the green channel, which uses the imager 38B having the cover glass 39B (although inclusion thereof is dependent on the particular of the design imager 3 8B). The other colors have corresponding color images imparted thereon in the projection lens 152 by operation of the imagers 38A, 38C. In other embodiments, weak correcting elements may be employed to correct the colors associated with the other imagers (i.e., 38A and 38C).

Another consideration for the projection systems 10, 50, 150 is the use of high power light sources, such as those described in the aforementioned U.S. Patent Nos. 5,404,026 and 5,606,220 and in U.S. patent application Ser. Nos. 08/747,190 and 08/771,326, when aspheric elements or aspheres are also included in the lenses 12, 52, 152. Aspheres are frequently constructed of a polymer or polymer materials. Certain polymer materials, although exhibiting excellent optical properties, can also exhibit detrimental thermal effects due to temperature changes that occur in the materials when high power light passes through the polymer asphere. High power light can negatively impact the projected images through these temperature changes. For example, aspheres constructed of acrylic material are subject to changes in refractive index with increasing temperature. This is because of a high coefficient of thermal refractive index change. As a result, focus can change with temperature. Clever design using aspheres, however, may enable this thermal effect to be substantially canceled or eliminated, which is termed athermalization. The projection systems 10, 50, 150 shown in FIGS. 1–3, 5 and 18 implement athermalization. The projection lenses 12, 52, 152 provide athermalization by carefully designing them to use aspheres (e.g., the lens elements 26 and 30) and to shift (e.g., positive) optical power from the aspheres (which can, therefore, have weak optical power) to the other elements that pass the high power light earlier as the light proceeds through the front lens units 14, 14'. These other elements are the lens elements 18, 20, 22, or 24, which allow the aspheric element 26 to be designed with lower (e.g., positive) optical power than might otherwise be required. These other elements can be constructed of glass, which is less subject to thermal refractive index changes than are the polymer aspheres. Related detrimental thermal imaging effects are thereby avoided or prevented. The same thermal problem is unlikely to occur with negatively powered lens elements, such as the aspheric element 30, where the beam diameter is small for any field position. If the aspheres were made of glass instead of polymer, such thermal effects could likewise be reduced or eliminated. In this latter case, the glass aspheres would not necessarily be limited to having weak optical power.

The remote aperture stop projection lenses 12, 52, and 152 described herein offer improved optical performance. The benefits of having a remote aperture stop include better exclusion of out-of-angle light than conventional lens designs. The remote aperture stop projection lenses 12, 52, 152 also provide wide fields of view, are telecentric, and exhibit excellent resolution and near zero distortion. The projection lenses 12, 52, 152 are compact and manufacturable. They also minimize ghost image formation and offer improved uniformity of screen brightness. For athermalization purposes, strategic use can be made of two (or more) aspheric surfaces (e.g., constructed of acrylic material) in these compound lenses that are otherwise composed substantially of spherical glass surfaces and materials. Moreover, the projection lens 152 can additionally provide substantial lateral color correction for color imaging with light passing through the same optical components (aspheric glass elements are also feasible).

The projection lens systems 10, 50, 150 may be similar to image engines described in prior, co-owned U.S. patent application Ser. No. 08/730,818, filed Oct. 17, 1996, by Richard M. Knox, entitled "Image Projection System Engine Assembly," which is incorporated by reference herein in its entirety. The projection lens systems 10, 50, 150 may be advantageously employed in front or rear projection systems, such as "folded" or "folded optics" display apparatuses. The display apparatuses 200 and 250 shown in FIGS. 19 and 20, respectively, are examples of these folded apparatuses in accordance with fifth and sixth embodiments of the invention. One or more imager configurations (e.g., that use two or three imagers, like the imagers 38A, 38B, 38C) using color liquid crystal filters may be employed. The display apparatuses 200 and 250 can be part of a computer monitor or television display. They are similar to the projection systems described in prior, co-owned U.S. patent application Ser. No. 08/581,108, filed Dec. 29, 1995, by Richard M. Knox, and in European Pat. app. No. 96309443.8, EP0783133A1, filed Dec. 23, 1996, by Richard M. Knox et al., published Jul. 9, 1997, both entitled "Projecting Images," which are incorporated by reference herein in their entirety. Such a "double bounce" geometry offers distinct advantages. For instance, the folded optical paths in the display apparatuses 200, 250 enable the size of the apparatuses 200, 250 to be reduced compared to other types of display apparatuses. This is illustrated in FIGS. 19 and 20, where the "footprint" dimensions "L" and "L'," respectively, may be made smaller by folding the optical paths, making the apparent or effective projection lengths seem longer than the actual projection lengths.

Figure 19:
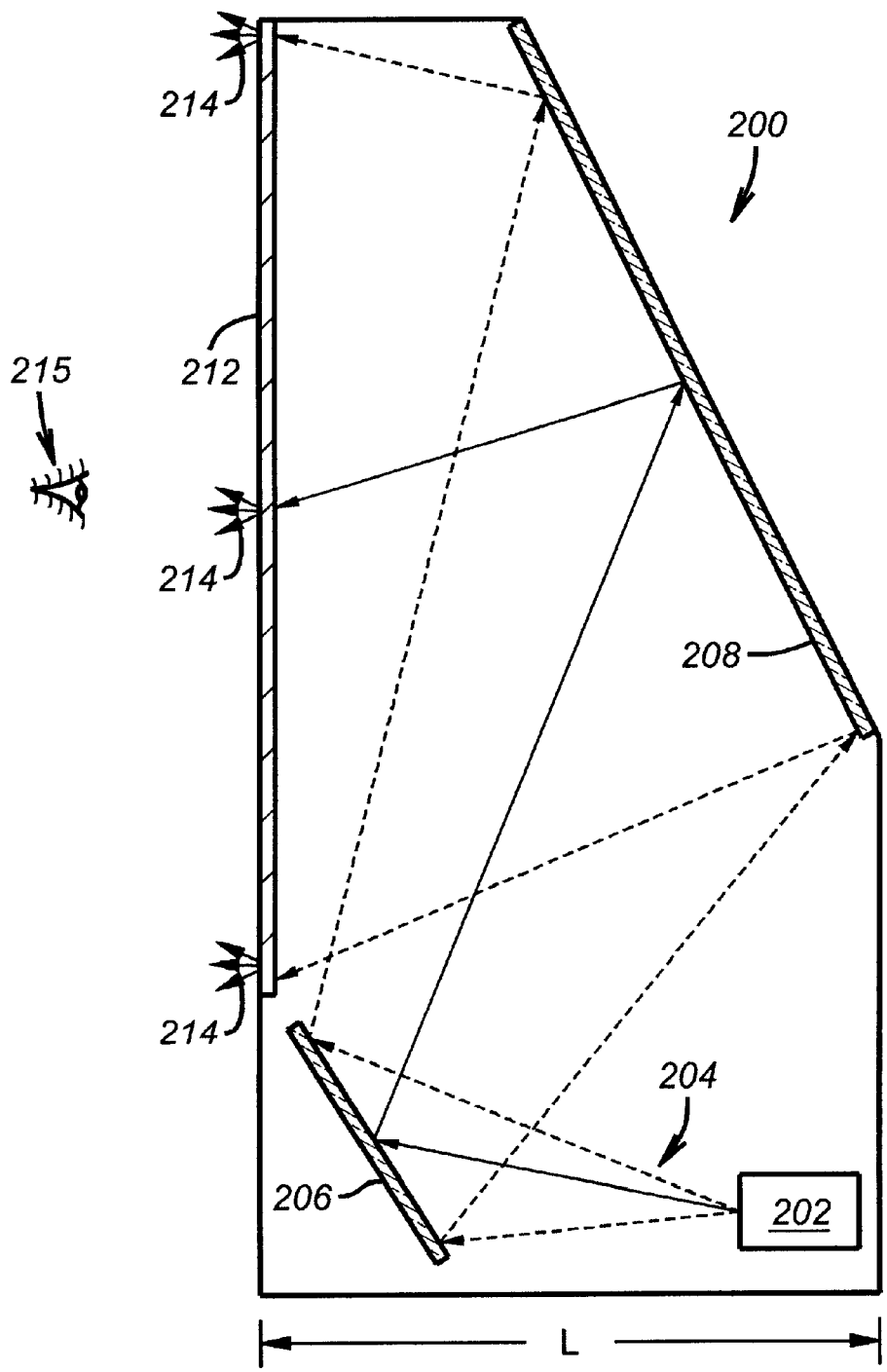
FIG. 19 is a side view of a display apparatus in accordance with a fifth embodiment of the invention.

Referring to FIG. 19, the display apparatus 200 includes an image engine or projector 202. The image engine 202 may be similar to the projection lens systems 10, 50, 150. The image engine 202 may also be similar to the image engines described in the aforementioned U.S. patent application Ser. No. 08/730,818. The image engine 202 outputs image light 204 in response to input signals, for example, electronic, video, or other signals received from an antenna, cable, computer, or controller. The image light 204 (e.g., the image light 49 from the projection lenses 12, 52 in FIGS. 1–4 or analogous image light from the projection lens 152) reflects off a lower mirror or reflector 206 to a higher mirror or reflector 208. The light 204 is then reflected by the upper mirror or reflector 208 and is directed to a screen 212, for example, a diffusive screen or diffuser. The screen 212 (e.g., similar to the screen 36) scatters the image light as light 214, which a viewer 215 can see as forming an image at the screen 212 of the display apparatus 200.

Figure 20:
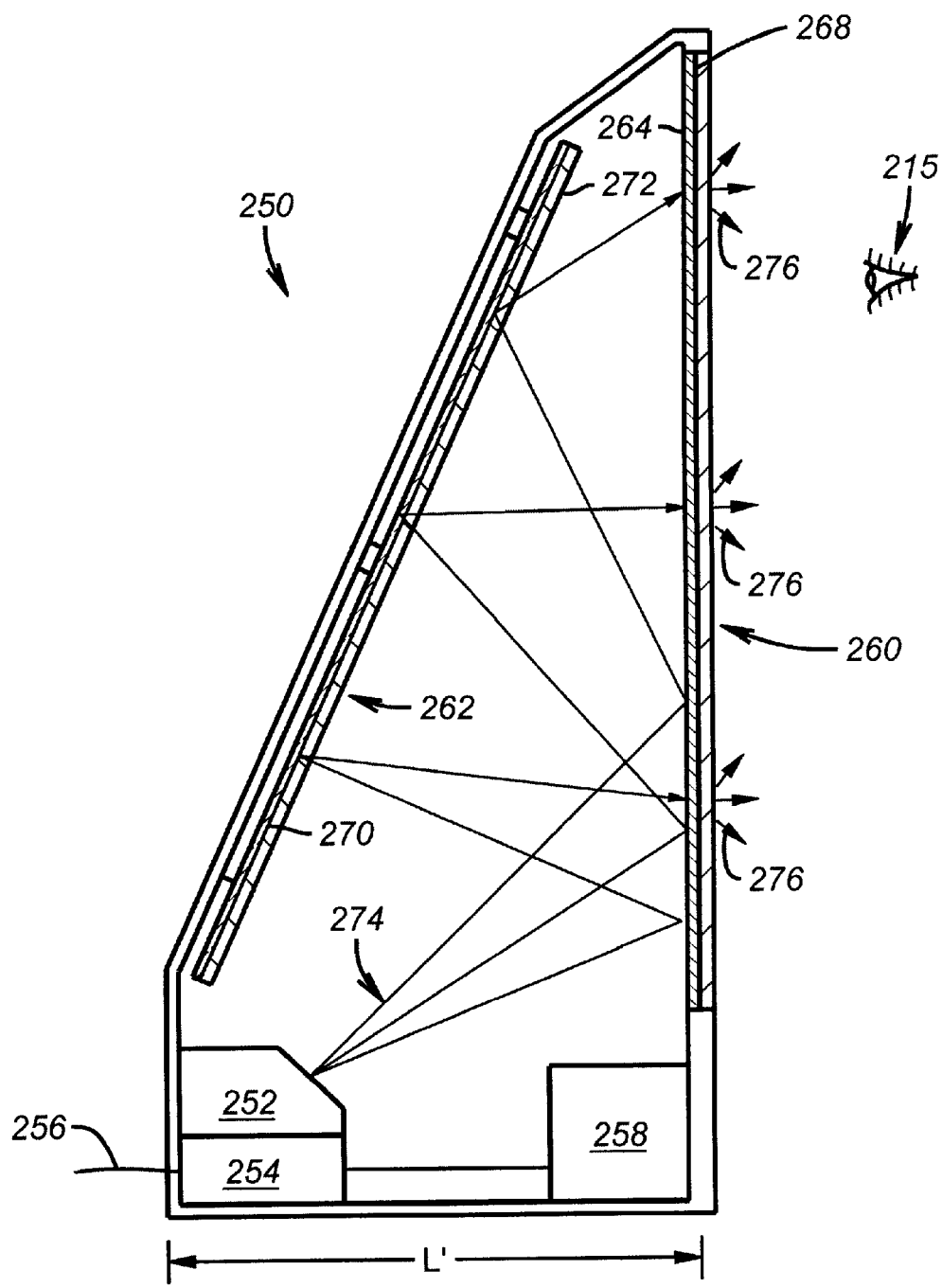
FIG. 20 is a side view of another display apparatus in accordance with a sixth embodiment of the invention.

Referring to FIG. 20, the display apparatus 250 is shown, which includes an image engine or projector 252, a signal splitter 254, an input cable 256, a sound system 258, a screen apparatus 260, and a back mirror or reflector 262. The image engine 252 may be similar to the projection lens systems 10, 50, 150 described above and those in the aforementioned U.S. patent application Ser. No. 08/730,818. The screen apparatus 260 includes a reflecting linear polarizer 264 and a screen 268, which, depending on the specific design, may be layered, coated, bonded (e.g., with index matching adhesive), laminated (e.g., as one element), or otherwise applied together in the order shown in FIG. 20. The reflecting linear polarizer 264 and the screen 268 may be held together with no air gap or with substantially no air gap. Alternatively, in other embodiments, the reflecting linear polarizer 264 and the screen 268 may be held together in spaced apart relation.

The screen 268 (e.g., similar to the screen 36) may be a diffusive screen or a diffuser, and the reflecting linear polarizer 264 may be constructed of MOF. Other polarizing reflector or wide-angle polarizing reflector materials could also be used. The reflecting linear polarizer 264 has the characteristic of preferentially reflecting light of one linear polarization and preferentially transmitting light of another, linear but orthogonal, polarization, as discussed above.

The back reflector 262 includes a mirror or reflector 270 and an achromatic retarder 272 that, depending on the design, may be layered, coated, bonded (e.g., with index matching adhesive), adjacent or otherwise applied together in the order shown in FIG. 20. The back mirror or reflector 270 and the achromatic retarder 272 may be held together in spaced apart relation or not be held spaced apart (i.e., with substantially no air gaps). A suitable achromatic retarder 272 may be designed to accommodate the spaced apart arrangement, as will be appreciated by those skilled in the art having the benefit of the present disclosure.

In operating the display apparatus 250, the image engine 252 receives an electronic signal through the input cable 256 and provides the signal to the signal splitter 254. The signal splitter 254 divides the signal into, for example, a video signal and an audio signal, and provides these signals to the image engine 252 and the sound system 258, respectively. The image engine 252 converts the video signal into projected image light 274 (e.g., the image light 49). The electronic signal received by the cable 256 may be any type of signal containing video information, such as a television signal received by an antenna or over cable lines, or a computer video signal received through a computer video cable. The audio signal and the sound system are optional.

The image light 274 may be polarized in the image engine 252, for example, by the operation of the reflecting linear polarizer 32, the imagers 38A, 38B, 38C, the pre-polarizer 86, and the clean-up element 34, if present, as described above. A light source (not shown) in the image engine 252 or other light source may be used to input linearly polarized light initially into the image engine 252 in an illumination subsystem similar to those described above. The light would then be processed by the polarizer 32, the imagers 38A, 38B, 38C, and the pre-polarizer 86, the clean-up polarizer, if present, or as determined by an external polarizer. The image light 274 may be polarized in the second polarization discussed above or have its polarization determined by another polarizer that is employed external to the projection lens (not shown in FIG. 20) of the image engine 252. In a first instance, the image light 274 output from the image engine 252 is polarized in the second polarization direction, for example. The light 274 is then reflected by the reflecting linear polarizer 264 toward the back reflector 262. The reflected image light 274 passes through the achromatic retarder 272 a first time in one direction, is reflected by the back mirror or reflector 270, and passes through the achromatic retarder 272 a second time, directed again toward the screen apparatus 260. The achromatic retarder 272 is designed to have an optical thickness of substantially one-quarter wave, such that the image light 274 in the second polarization will undergo an effective half-wave (i.e., substantially 90 degrees) polarization shift or rotation on double pass through the achromatic retarder 272. Thus, the image light 274, which is now directed toward the screen apparatus 260, will substantially be in the first polarization and will substantially pass through the reflecting linear polarizer 264 and to the screen 268. The screen 268 scatters this light as image light 276. The viewer 215 can then observe an image produced by the image light 276 at the screen 268 of the screen apparatus 260, in similarity to the descriptions given above.

In all embodiments of the invention, diffusive viewing screens or beaded screens may be used as the screens 36, 212, and 268. Beaded screens capture stray imaging light, have a limited acceptance angle, and the stray light is absorbed in a black matrix. Diffusive screens, on the other hand, scatter the stray light to improve homogeneity and/or uniformity in intensity across the viewing screen. The type of diffusive screens discussed herein include bulk diffusive screens. Surface diffusers, for example, ground glass and the like, could also be used instead of diffusive screens or beaded screens in accordance with other embodiments of the invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A projection lens system, comprising:
   an illumination subsystem comprising
   a light source, and
   a lightguide adapted to direct illumination light from the light source;
   a projection lens comprising
   a front lens unit,
   a back lens unit, and
   a reflecting linear polarizer adapted to direct the illumination light from the lightguide to the back lens unit and to direct image light to the front lens unit; and
   an imager adapted to impart image information on the image light.

2. The projection lens system of claim 1, wherein the lightguide comprises a tapered light pipe.

3. The projection lens system of claim 1, wherein the lightguide is adapted to provide the illumination light to the imager as substantially telecentric light.

4. The projection lens system of claim 1, wherein the lightguide comprises a compound parabolic concentrator.

5. A method of projecting light, comprising:
   directing light from a light source to a lightguide;
   directing the light that is substantially telecentric light from the lightguide to a projection lens;
   directing a portion of substantially telecentric light having a certain polarization toward an imager associated with a projection lens;
   imparting an image on the portion of the light having polarization rotated; and
   directing the image from the projection lens.

6. The method of claim 5, further comprising:
   directing another portion of the substantially telecentric light having a polarization substantially orthogonal to the certain polarization back toward the light source.

\* \* \* \* \*

UNITED STATES PATENT AND TRADEMARK OFFICE
CERTIFICATE OF CORRECTION

PATENT NO. : 6,220,713 B1
DATED : April 24, 2001
INVENTOR(S) : Biljana Tadic-Galeb, Robert E. Fischer, David Kappel, Neil L. Condra, Ann M. Muscado and Sean M. Donnelly It is certified that error appears in the above-identified patent and that said Letters Patent is hereby corrected as shown below:

<u>Title page,</u>
Title should read -- Projection Lens System and Method of Projecting Light. --

Signed and Sealed this

Fourth Day of December, 2001

*Attest:*

NICHOLAS P. GODICI
*Attesting Officer*     *Acting Director of the United States Patent and Trademark Office*